(12) United States Patent
Yoshizawa

(10) Patent No.: US 11,989,344 B2
(45) Date of Patent: May 21, 2024

(54) INFORMATION DISPLAY DEVICE

(71) Applicant: MAXELL, LTD., Kyoto (JP)

(72) Inventor: Kazuhiko Yoshizawa, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/797,124

(22) PCT Filed: Feb. 21, 2020

(86) PCT No.: PCT/JP2020/007181
§ 371 (c)(1),
(2) Date: Aug. 3, 2022

(87) PCT Pub. No.: WO2021/166238
PCT Pub. Date: Aug. 26, 2021

(65) Prior Publication Data
US 2023/0057452 A1    Feb. 23, 2023

(51) Int. Cl.
*G09G 5/00*    (2006.01)
*G06F 3/01*    (2006.01)
*G06F 3/0482*    (2013.01)

(52) U.S. Cl.
CPC ............ *G06F 3/013* (2013.01); *G06F 3/0482* (2013.01); *G06F 2203/04803* (2013.01)

(58) Field of Classification Search
CPC ...... G06F 1/1626; G06F 1/163; G06F 1/1686; G06F 3/013; G06F 3/0147; G06F 3/0482;
(Continued)

(56) References Cited

U.S. PATENT DOCUMENTS 4,722,601 A * 2/1988 McFarlane ............. G02B 27/64
356/252
7,710,654 B2 * 5/2010 Ashkenazi ............. G02B 27/01
359/630
(Continued)

FOREIGN PATENT DOCUMENTS

JP    09-18774 A    1/1997
JP    2017-134601 A    8/2017
(Continued)

OTHER PUBLICATIONS

International Search Report of PCT/JP2020/007181 dated Apr. 21, 2020.

*Primary Examiner* — Joe H Cheng
(74) *Attorney, Agent, or Firm* — Mattingly & Malur, PC

(57) ABSTRACT

An information display device having a narrow display are, which enhances the operability and convenience of a user without requiring an additional hardware configuration, comprising: a display; a line-of-sight detection sensor configured to detect a line of sight of a user; a line-of-sight position detection unit configured to detect, as a line-of-sight position, an intersection between the line of sight detected by the line-of-sight detection sensor and the display; and a display control unit configured to control the display in accordance with the line-of-sight position detected by the line-of-sight position detection unit. The display control unit displays a predetermined menu in the first area, which is a display area within the display, when detecting an entering behavior in which the line-of-sight position moves from outside to inside the first area.

13 Claims, 14 Drawing Sheets

(58) Field of Classification Search
CPC ....... G06F 3/04842; G06F 2203/04803; G06F 3/017; G02B 27/017; G02B 27/0178
See application file for complete search history.

(56) References Cited

U.S. PATENT DOCUMENTS

| | | | |
|---|---|---|---|
| 9,618,759 B2* | 4/2017 | Morifuji | H04N 13/344 |
| 11,287,651 B2* | 3/2022 | Rao | G02B 27/0093 |
| 2013/0044138 A1* | 2/2013 | Koga | B60K 35/00 345/672 |
| 2014/0285404 A1* | 9/2014 | Takano | G06F 3/04812 345/8 |
| 2016/0054795 A1* | 2/2016 | Sasaki | G06F 3/013 345/642 |
| 2016/0239081 A1 | 8/2016 | Moto et al. | |
| 2016/0291693 A1* | 10/2016 | Tang | G02B 27/0172 |
| 2017/0078447 A1* | 3/2017 | Hancock | H04N 21/4424 |
| 2018/0032132 A1 | 2/2018 | Sudou et al. | |

FOREIGN PATENT DOCUMENTS

| | | | |
|---|---|---|---|
| WO | 2015/064165 A1 | 5/2015 | |
| WO | 2016/136837 A1 | 9/2016 | |

* cited by examiner

FIG. 10

| APPLICATION | AREA | DISPLAYED MENU, ETC. |
|---|---|---|
| AAA | 311d | MAIN MENU (MENU, ETC., DISPLAYED UPON SELECTION OF WINDOWS START BUTTON) |
| | 311l | APPLICATION ICON LIST (SHORTCUT LIST OF APPLICATIONS THAT CAN BE ACTIVATED IN INFORMATION DISPLAY DEVICE) |
| | 311r | PERFORMANCE MONITOR SCREEN (WINDOWS TASK MANAGER SCREEN, ETC.) |
| | 311u | WEB SEARCH RESULT RELATING TO IMAGE ACQUIRED BY EXTERNAL CAMERA |
| ... | ... | ... |

INFORMATION DISPLAY DEVICE

TECHNICAL FIELD

The present invention relates to an information display technique, especially, a menu display technique.

BACKGROUND ART

There has been known information display devices, such as head-mounted displays (HMDs) and smartphones, which are worn or carried by a user and display information. A display area of such an information display device is narrow due to its nature, and accordingly, using a user's line of sight to give an operation instruction enhances the convenience thereof.

For example, Patent Literature 1 discloses an electronic device "including a decision means A, a function type display means B, a line of sight position detection means C, a matching detection means D, a function name list display means E, and a function setting means F so as to display, on a display device G as a list, the contents of functions provided in an electronic device body and names of the functions set in the electronic device body, and also enable, using the user's line of sight, the selection and setting of the type and name of the function displayed on the display device G from among the list, so that one of the multiple functions provided in the electronic device can be selected, thereby improving the operability at the time of setting a function to be executed by the electronic device (excerpted from Abstract)".

CITATION LIST

Patent Literature

Patent Literature 1: JP-A-H09-18774

SUMMARY OF INVENTION

Technical Problem

However, according to the technique described in Patent Literature 1, in order to display an initial menu or change the type of the initial menu to be displayed, a user has to press a physical selection switch. This requires mounting of a physical switch and a user's operation using the finger, thereby making the device complex and expensive.

The present invention has been made in view of the circumstances above, and thus an object of the present invention is to provide a technique for an information display device having a narrow display area, which can enhance the operability and convenience of a user without requiring an additional hardware configuration.

Solution to Problem

The present invention provides an information display device, comprising: a display; a line-of-sight detection sensor configured to detect a line of sight of a user; a line-of-sight position detection unit configured to detect, as a line-of-sight position, an intersection between the line of sight detected by the line-of-sight detection sensor and the display; and a display control unit configured to control the display in accordance with the line-of-sight position detected by the line-of-sight position detection unit, the display control unit being further configured to, when detecting an entering behavior in which the line-of-sight position moves from an outside of a first area, which is a display area within the display, to an inside of the first area, display a predetermined menu in the first area.

Advantageous Effects of Invention

According to the present invention, it is possible to provide a technique for an information display device having a narrow display area, which can enhance the operability and convenience of a user without requiring an additional hardware configuration. The problems, configurations, and advantageous effects other than those described above will be clarified by explanation of an embodiment below.

Figure 2A:
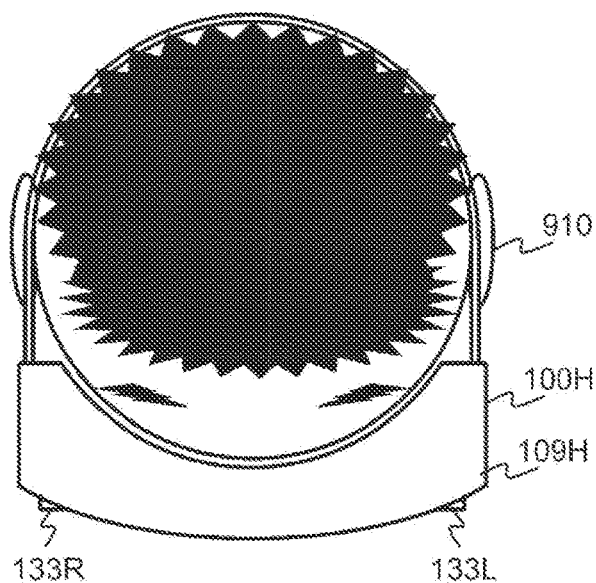
Figure 2B:
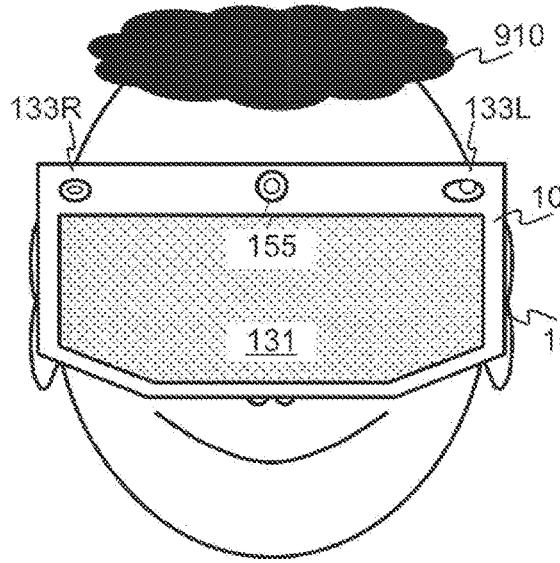
Figure 2C:
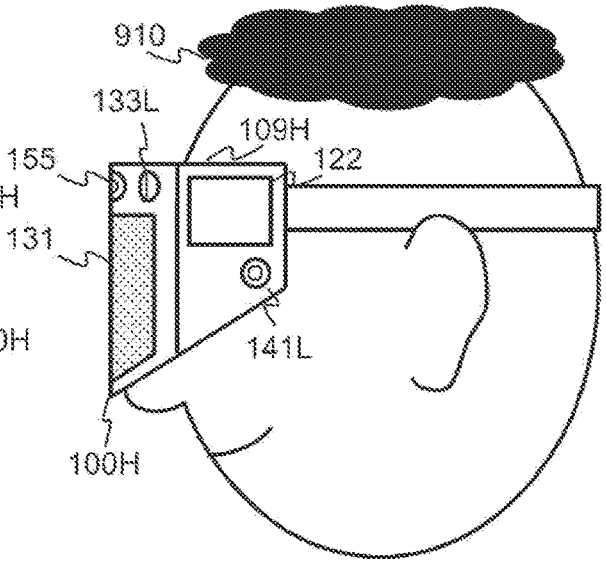

Each of FIG. 2A to FIG. 2C illustrates an appearance of an information display device in the case where the information display device according to the embodiment of the present invention is a head-mounted display.

Figure 3A:
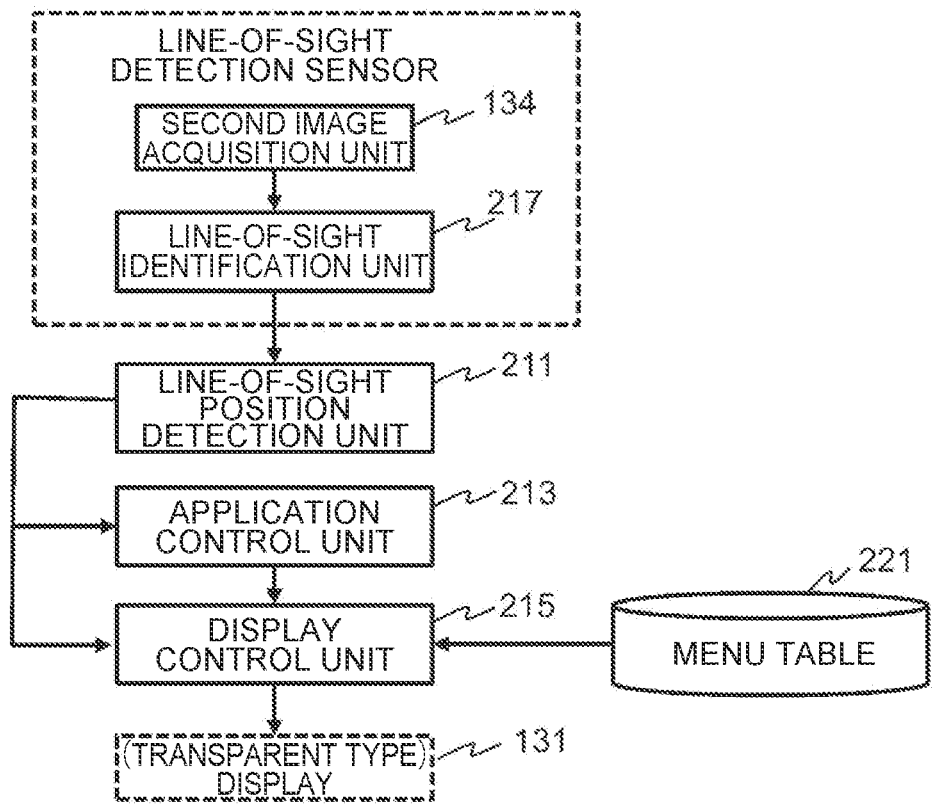
Figure 3B:
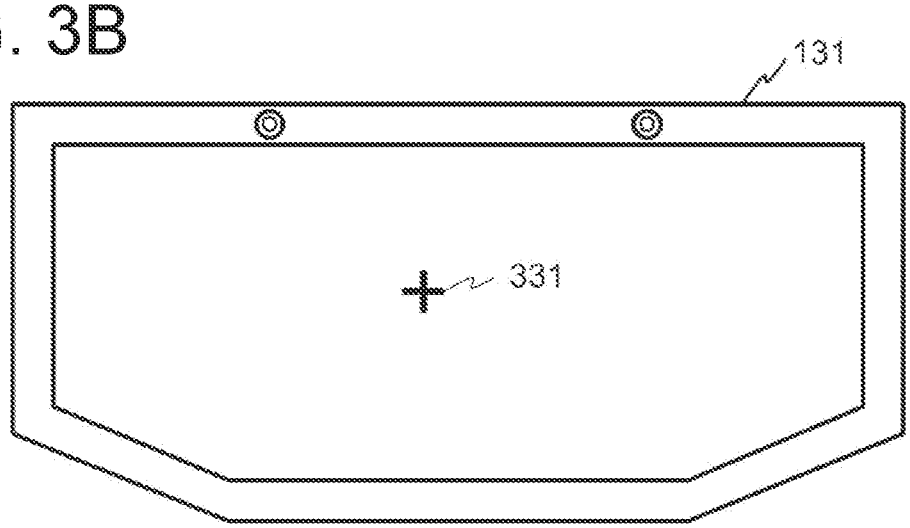

FIG. 3A is a functional block diagram of the information display device according to the embodiment of the present invention, and FIG. 3B illustrates a line-of-sight position on the information display device according to the embodiment of the present invention.

Figure 4A:
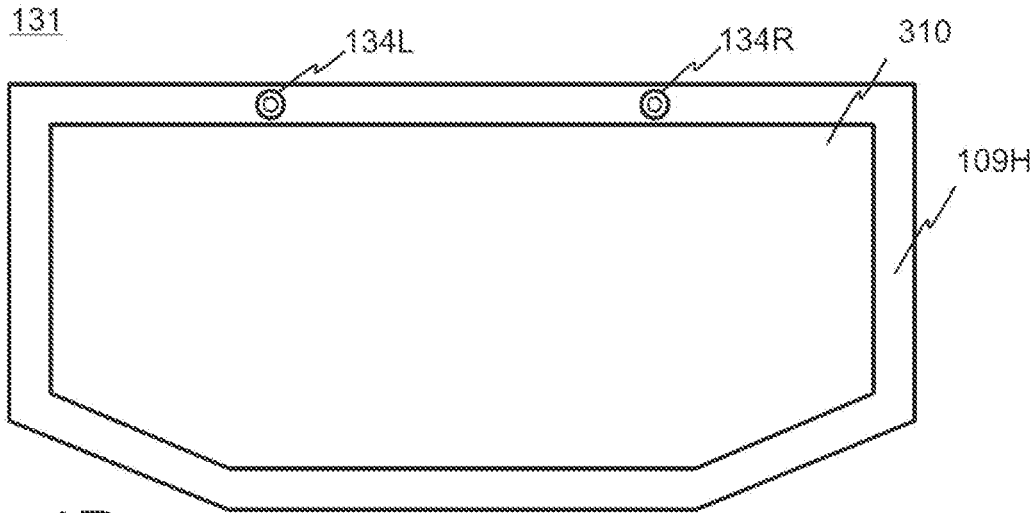
Figure 4B:
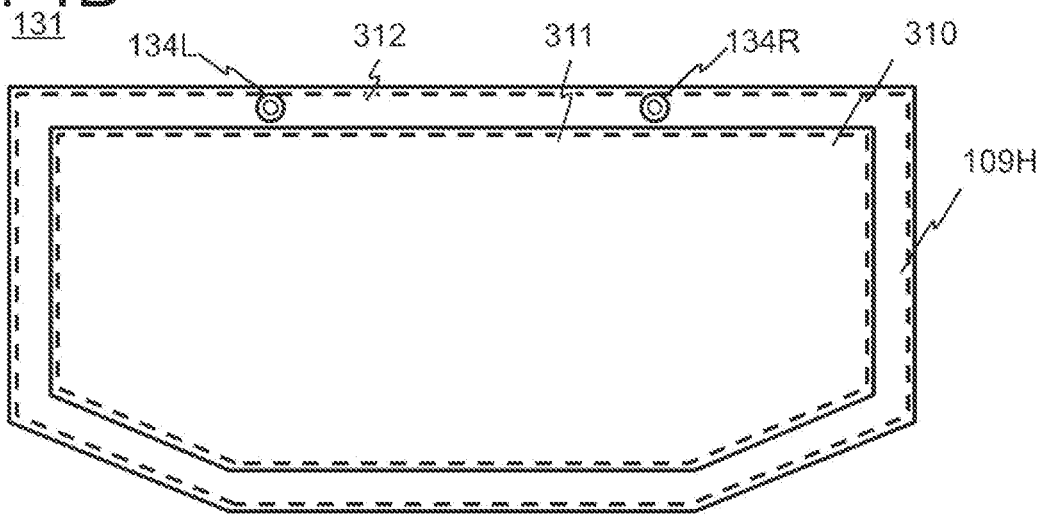
Figure 4C:
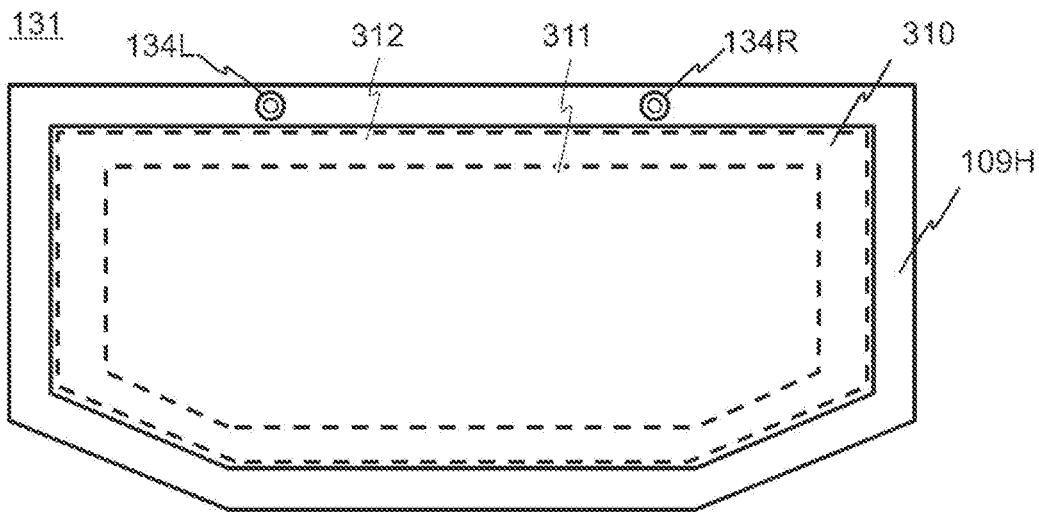

Each of FIG. 4A to FIG. 4C illustrates a line-of-sight detection area and display area according to the embodiment of the present invention.

Each of FIG. 5A to FIG. 5D illustrates a menu display behavior according to the embodiment of the present invention.

Each of FIG. 6A to FIG. 6D illustrates one of other examples of the menu display behavior according to the embodiment of the present invention.

Each of FIG. 7A to FIG. 7D illustrates a menu removal behavior according to the embodiment of the present invention.

Figure 8:
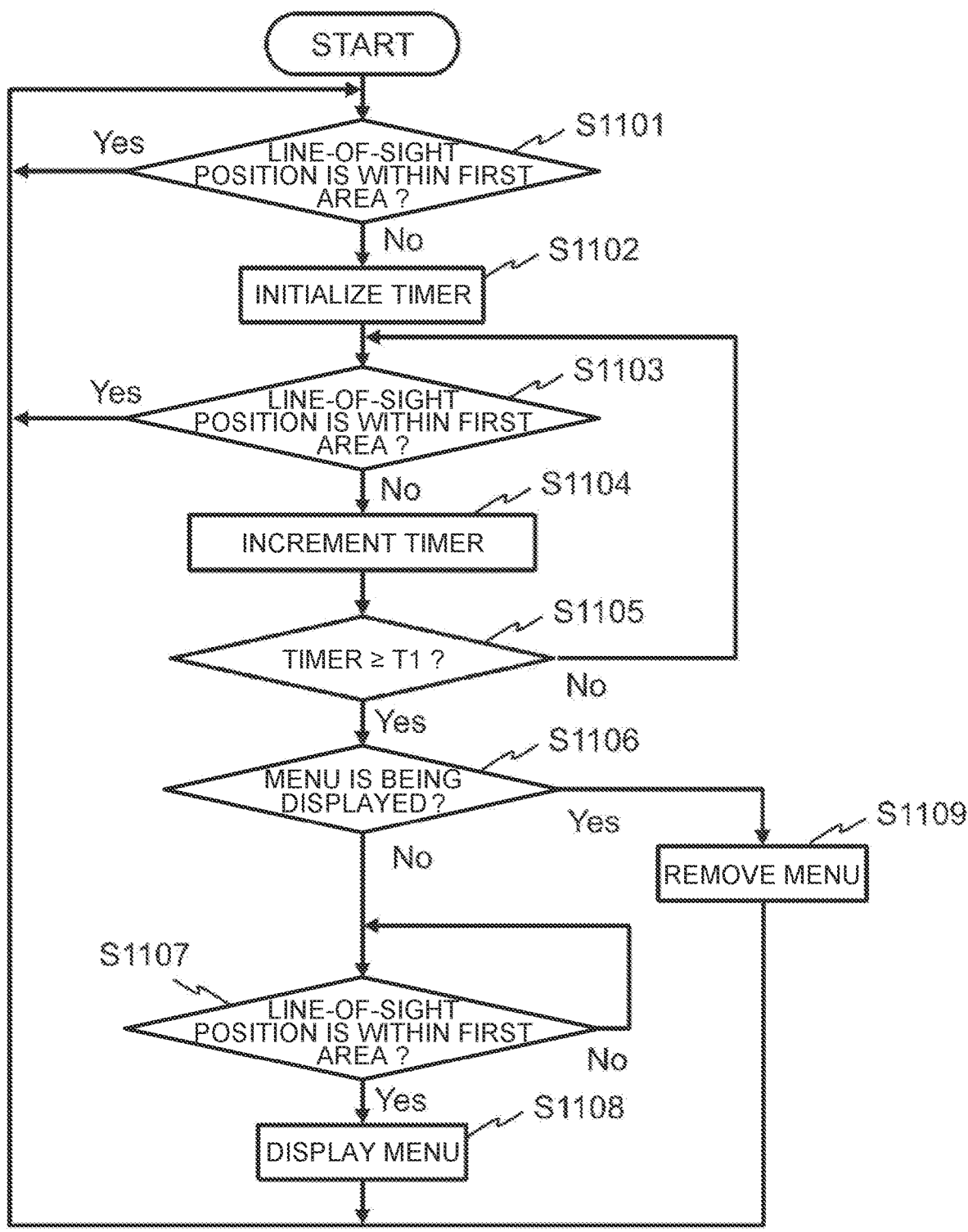

FIG. 8 is a flowchart of menu display control processing according to the embodiment of the present invention.

Figure 9A:
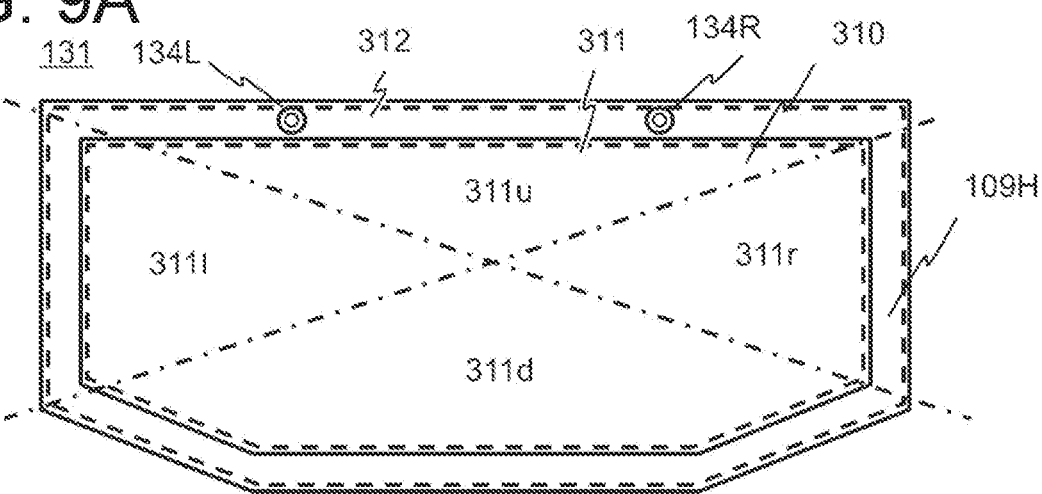
Figure 9B:
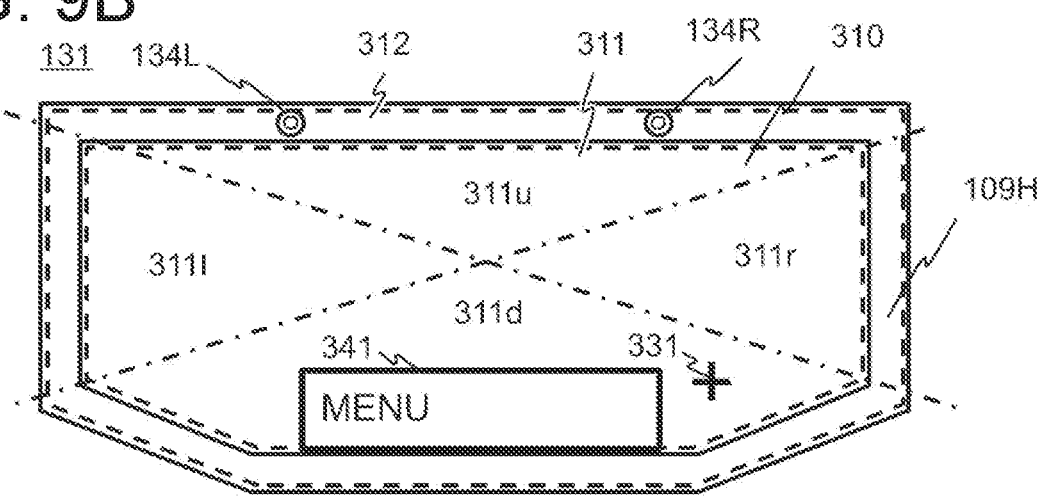
Figure 9C:
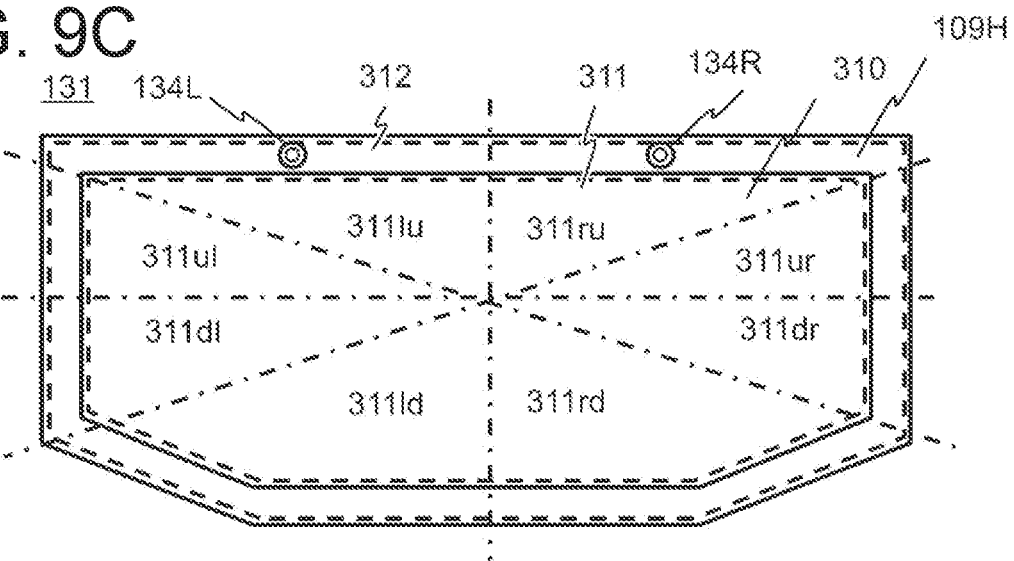

Each of FIG. 9A to FIG. 9C illustrates one of other examples of menu display according to the embodiment of the present invention.

FIG. 10 illustrates a menu table according to the embodiment of the present invention.

Figure 11A:
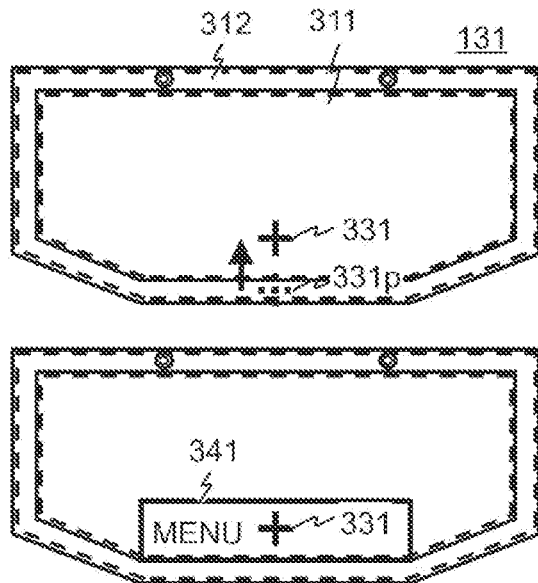
Figure 11B:
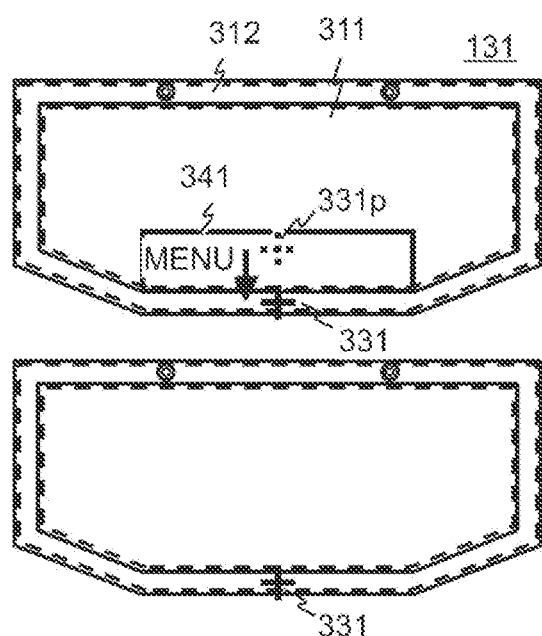
Figure 11C:
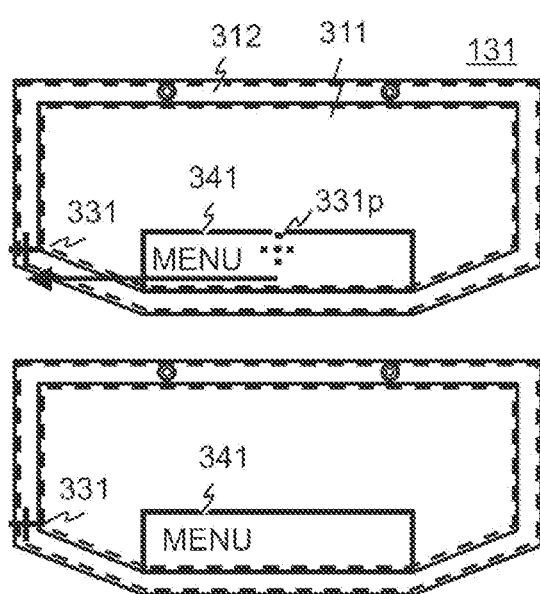

Each of FIG. 11A to FIG. 11C illustrates a modification of the menu display control according to the embodiment of the present invention.

Figure 12A:
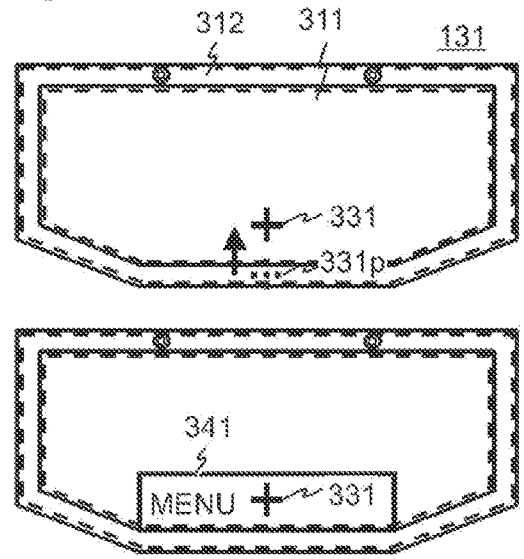
Figure 12B:
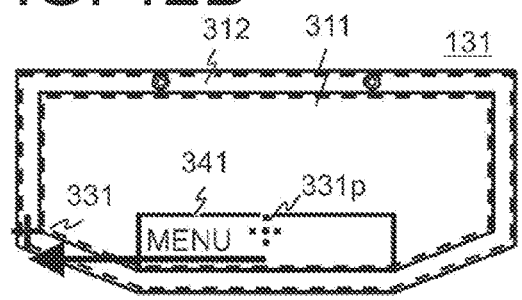
Figure 12B:
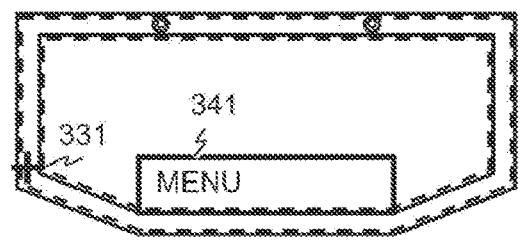
Figure 12B:
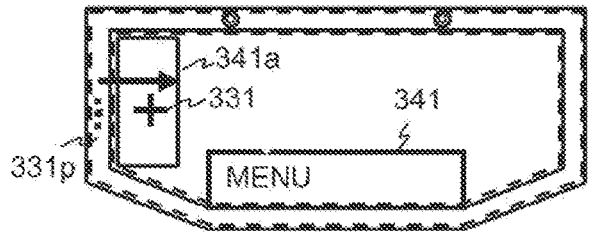
Figure 12C:
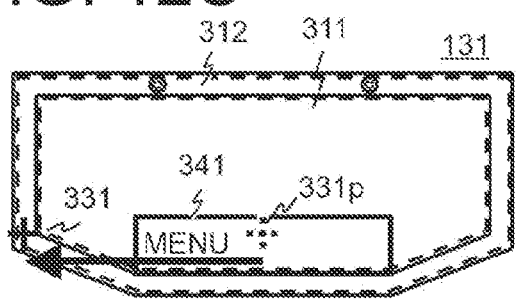
Figure 12C:
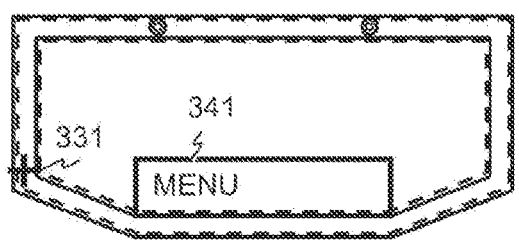
Figure 12C:
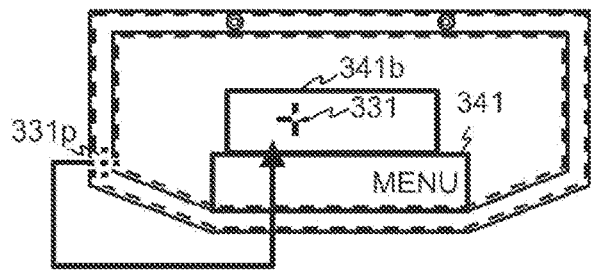

Each of FIG. 12A to FIG. 12C illustrates a further modification of the menu display control according to the embodiment of the present invention.

Figure 13A:
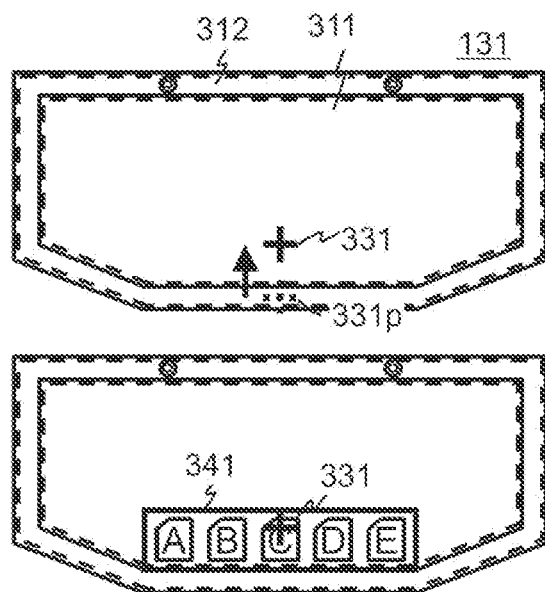
Figure 13B:
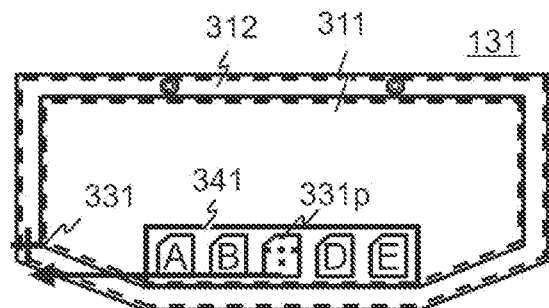
Figure 13C:
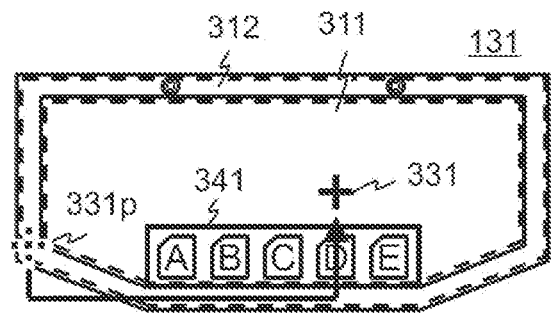

Each of FIG. 13A to FIG. 13C illustrates a still further modification of the menu display control according to the embodiment of the present invention.

Figure 14A:
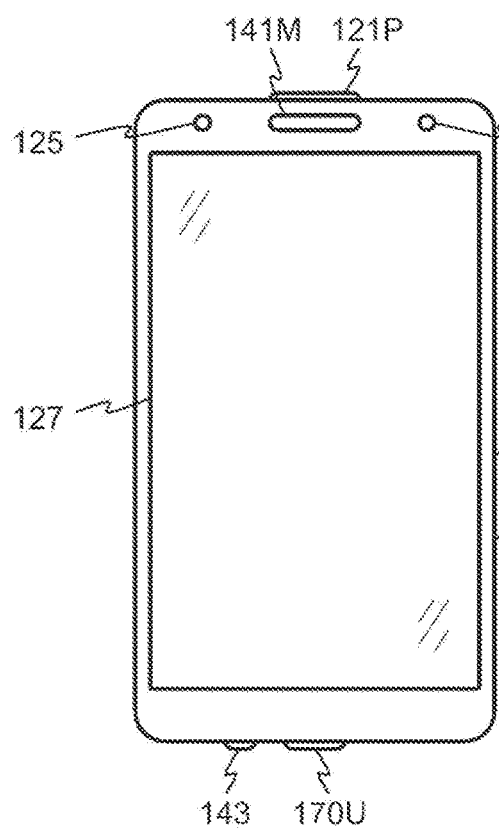
Figure 14B:
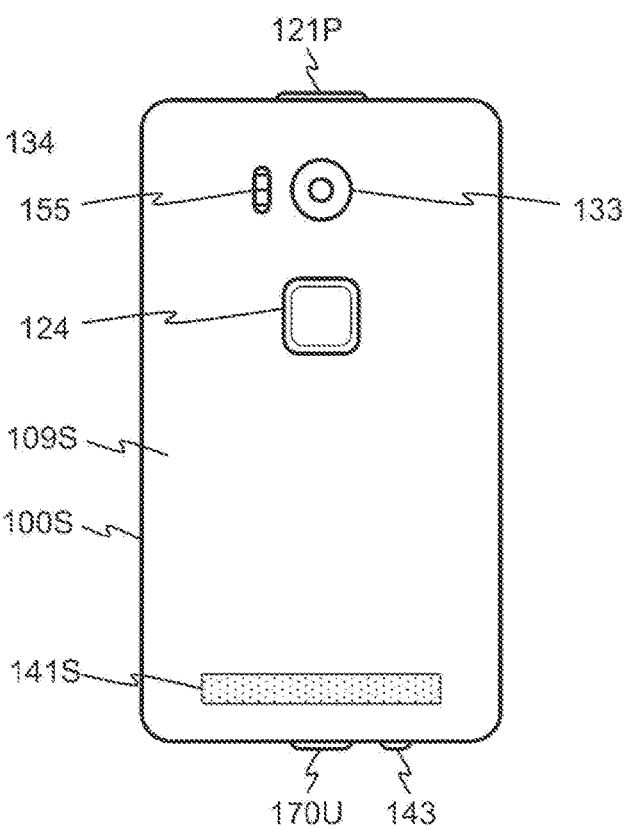

Each of FIG. 14A and FIG. 14B illustrates an appearance of an information display device, in the case where the information display device according to the embodiment of the present invention is a smartphone.

DESCRIPTION OF EMBODIMENTS

Hereinafter, an embodiment of the present invention will be described with reference to the drawings. Note that the same reference sign used in the drawings indicates the same function or process.

[Hardware Configuration of Information Display Device]

Firstly, a hardware configuration of an information display device according to the present embodiment will be described. An information display device 100 of the present embodiment is a mobile information processing device having a function of detecting a line of sight of a user and a display function. The information display device 100 is, for example, a head-mounted display (HMD), a smart phone, and the like. A display unit of the information display device 100 is configured to implement its display function by (optical) transparent AR display technology, camera-through (in other words "video transparent") AR technology, and the like.

Figure 1:
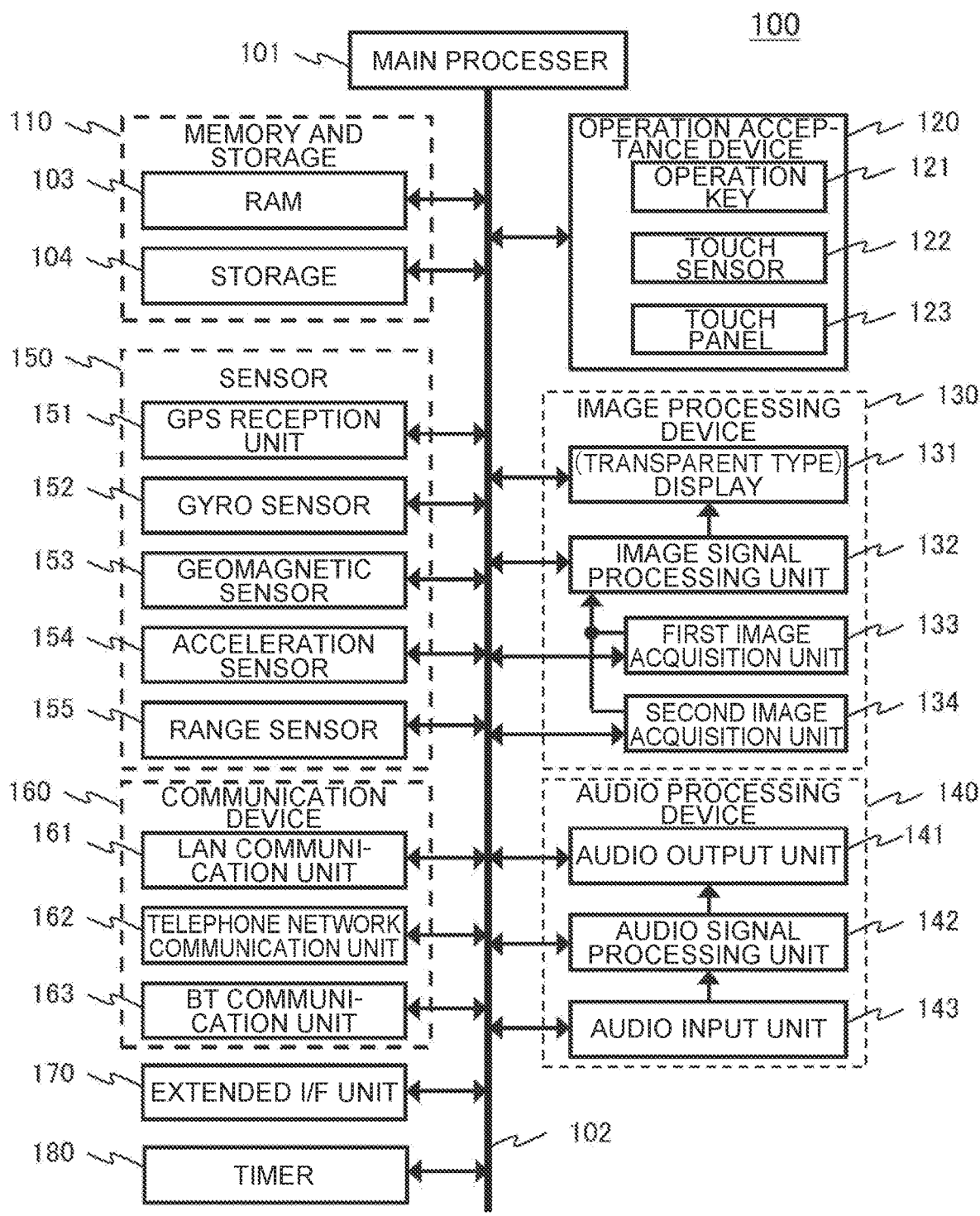
FIG. 1 illustrates a hardware configuration of an information display device according to an embodiment of the present invention.

FIG. 1 illustrates a hardware configuration of the information display device 100 according to the present embodiment. As illustrated in FIG. 1, the information display device 100 of the present embodiment includes a main processor 101, a system bus 102, a memory and storage 110, an operation acceptance device 120, an image processing device 130, an audio processing device 140, a sensor 150, a communication device 160, an extended interface (I/F) unit 170, and a timer 180.

The main processor 101 is a main control unit configured to control the entire of the information display device 100 in accordance with a predetermined program. The main processor 101 is implemented using a central processor unit (CPU) or a microprocessor unit (MPU). The main processor 101 executes the processing in accordance with a clock signal measured and output by the timer 180.

The system bus 102 is a data communication path through which data is transmitted and received between the main processor 101 and each part of the information display device 100.

The memory and storage 110 include a RAM 103 and a storage 104.

The RAM 103 is a program area during execution of a basic operation program or other application programs. Furthermore, the RAM 103 serves as a temporary storage area for temporarily holding data as necessary during execution of various application programs. The RAM 103 may be integrated with the main processor 101.

The storage 104 is configured to retain, for example, various operation setting values of the information display device 100, and information about a user of the information display device 100. In addition, the storage 104 may hold, for example, still image data and moving image data captured by the information display device 100. Here, the information display device 100 shall be able to extend its functions by downloading new application programs from application servers via the Internet. At this time, the downloaded new application programs are stored in the storage 104. The main processor 101 loads the new application programs stored in the storage 104 onto the RAM 103 and executes it, whereby the information display device 100 can obtain the various functions.

The storage 104 needs to hold stored information even while the information display device 100 is not being supplied with power. Accordingly, as the storage 104, a device such as a flash ROM, a solid-state drive (SSD), or a hard disc drive (HDD) is used.

The operation acceptance device 120 is configured to accept an operation instruction that has been input to the information display device 100. In the first embodiment, the operation acceptance device 120 includes an operation key 121 having such as a power key, a volume key, and a home key. In the case where the information display device 100 is the HMD 100H, the operation acceptance device 120 includes a touch sensor 122 for accepting an operation instruction through a touch pad. In the case where the information display device 100 is the smartphone 100S, the operation acceptance device 120 includes a touch panel 123 placed so as to be superimposed on a display 131. Note that the information display device 100 according to the present embodiment does not necessarily have to include all the functions of the operation acceptance device 120.

In the case of the smartphone 100S, it may be configured to accept an input of an instruction through such as a keyboard connected to the extended interface unit 170, which will be described later. Furthermore, the information display device 100 may accept operations through a separate information processing device connected thereto by wired communication or wireless communication.

The image processing unit 130 is an image (or video) processor, and includes the display 131, an image signal processing unit 132, a first image acquisition unit 133, and a second image acquisition unit 134.

The display 131 is, for example, a display such as a liquid crystal panel, and configured to present the image data processed by the image signal processing unit 132, which will be described later, to the user of the information display device 100. In the case where the information display device 100 is the HMD 100H, the display 131 may be a transparent type display.

The image signal processing unit 132 is an image (or video) signal processor configured to process images received from the first image acquisition unit 133 and the second image acquisition unit 134. The image signal processing unit 132 is further configured to superimpose an object created by the main processor 101 and the like on the input image, and output it to the display 131.

The first image acquisition unit 133 is configured to acquire images around the information display device 100. In the case of the HMD 100H, the first image acquisition unit 133 is an external camera. In the case of the smartphone 100S, the first image acquisition unit 133 is a rear camera (in other words "out-camera").

The second image acquisition unit 134 is configured to acquire images of an area different from an image acquisition area of the first image acquisition unit 133. For example, the second image acquisition unit 134 acquires images of the eye of the user. In the case of the HMD 100H, the second image acquisition unit 134 is an internal camera (camera for detecting a line-of-sight), and in the case of the smartphone 100S, the second image acquisition unit 134 is a front camera (in other words "in-camera"). Note that in the present embodiment, the second image acquisition unit 134 functions, together with a line-of-sight identification unit which will be described later, as a line-of-sight detection sensor.

The audio processing device 140 is an audio processor configured to process audio data, and includes an audio output unit 141, an audio signal processing unit 142, and an audio input unit 143. The audio output unit 141 is a speaker, and is configured to output the audio signal processed by the audio signal processing unit 142 to the outside. The audio signal processing unit 142 is an audio signal processor. The audio input unit 143 is a microphone, and is configured to convert a voice of the user or other sounds into audio data and input the converted audio data.

The sensor 150 includes a group of sensors configured to detect a state of the information display device 100. In the first embodiment, the sensor 150 includes a Global Positioning System (GPS) reception unit 151, a gyro sensor 152, a geomagnetic sensor 153, an acceleration sensor 154, and a range sensor 155. The sensor group including the sensors above enables detection of a position, movement, inclination, direction, and the like of the information display device 100. The range sensor 155 is a depth sensor, and is configured to acquire distance information from the information display device 100 to an object. The sensor 150 may further include other sensors.

The communication device 160 is a communication processor configured to execute communication processing, and includes a local area network (LAN) communication unit 161, a telephone network communication unit 162, and a Bluetooth (registered trademark, BT) communication unit 163. The LAN communication unit 161 is connected to a wireless communication access point of the Internet by wireless communication, thereby enabling transmission and reception of data. The telephone network communication unit 162 is connected to a base station of the mobile telephone communication network by wireless communication, thereby enabling telephone communication (in other words "telephone call") and transmission and reception of data. The BT communication unit 163 is an interface used to communicate with an external device in accordance with the Bluetooth standard. The LAN communication unit 161, the telephone network communication unit 162, and the BT communication unit 163 include an encoding circuit, a decoding circuit, an antenna, and the like, respectively. The communication device 160 may further include, for example, an infrared communication unit.

The extended interface unit 170 includes a group of interfaces used to extend the functions of the information display device 100. In the first embodiment, the extended interface unit 170 includes, for example, a charging terminal, an audiovisual interface, a universal serial bus (USB) interface, and a memory interface. The audiovisual interface is configured to receive a video signal and an audio signal from an external audiovisual output device, and output an audiovisual signal to the external audiovisual input device. The USB interface is used to connect a keyboard or other USB devices to the information display device 100. The memory interface is used to connect a memory card and other memory media to the information display device 100 to enable transmission and reception of data.

[Appearance of HMD]

Hereinafter, the case where the information display device 100 is an HMD will be described. In the following, appearance of the information display device 100 and states in which the information display device 100 is worn will be described. FIG. 2 illustrates the information display device 100, especially, FIG. 2A is a top view thereof, FIG. 2B is a front view thereof, and FIG. 2C is a side view thereof. Referring to FIGS. 2A, 2B, and 2C, an arrangement of each part described in the hardware configuration will be explained.

The information display device 100 includes a frame 109H used to support each part of the information display device 100, which is provided for the user to wear the information display device 100.

The display 131 is placed at the center of the front face of the frame 109H so as to positioned in front of both eyes of a user 910.

The touch sensor 122 is placed on a side face of the frame 109H. It may be provided on both left and right sides, respectively, or may be provided on either side.

The information display device 100 includes, as the first image acquisition unit 133, a left first image acquisition unit (left external camera) 133L and a right first image acquisition unit (right external camera) 133R. As illustrated in FIG. 2, the left first image acquisition unit 133L and the right first image acquisition unit 133R are placed on the left and right of the front face of the frame 109H of the HMD 100H, respectively.

The information display device 100 includes, as the audio output unit 141, a left audio output unit (corresponding to left stereo speaker) 141L and a right audio output unit (corresponding to right stereo speaker) 141R. As illustrated in FIG. 2, the left audio output unit 141L and the right audio output unit 141R are placed on the left and right-side faces of the frame 109H, respectively.

The range sensor 155 is placed at the center of the front face of the frame 109H. Instead of the range sensor 155, the left first image acquisition unit 133L and the right first image acquisition unit 133R may be used to measure a distance based on parallax.

Furthermore, the information display device 100 includes a charging terminal (corresponding to extended interface unit) 170P.

[Functional Block Diagram of HMD]

Next, the functions of the information display device 100 will be described. FIG. 3A is a functional block diagram of the information display device 100 according to the present embodiment. In the following, only the functional units relating to the processing according to the present embodiment are extracted and described.

In the present embodiment, the movement of the line of sight of the user 910 is used in the control as to whether a menu is to be displayed or not to be displayed. That is, in the present embodiment, the detected movement of the line of sight of the user 910 is analyzed, and when the line of sight of the user 910 moves into a display area after being present outside the display area for a predetermined period of time, the menu is displayed at a predetermined position in the display area.

In order to realize the above, the information display device 100 according to the present embodiment includes, as illustrated in FIG. 3A, a line-of-sight identification unit 217, a line-of-sight position detection unit 211, an application software control unit (hereinafter, simply referred to as an application control unit) 213, and a display control unit 215. The information display device 100 further includes a menu table 221, which will be described later.

The main processor 101 loads a program previously stored in the storage 104 onto the RAM 103 and executes it, whereby each of the functions above is implemented.

The menu table 221 is stored in the memory and storage 110.

The line-of-sight identification unit 217 is configured to analyze an image acquired by the second image acquisition unit 134 to acquire the line-of-sight information about the user 910. In the present embodiment, as the line-of-sight information, a direction in which the user 910 is looking (line-of-sight direction) through the display 131 is detected. In order to detect the line-of-sight direction and facial expression, a line-of-sight detection and facial expression recognition technique using an existing wearable device can be used.

In the present embodiment, as described above, the second image acquisition unit 134 and the line-of-sight identification unit 217 function as a line-of-sight detection sensor. The line-of-sight detection sensor continuously identifies the line-of-sight direction at a predetermined time interval, and outputs it to the line-of-sight position detection unit 211.

The line-of-sight position detection unit 211 is configured to analyze the line-of-sight direction so as to detect the movement of the line-of-sight each time it acquires the line-of-sight direction from the line-of-sight detection sensor (line-of-sight identification unit 217). In the present embodiment, the line-of-sight position detection unit 211 detects the movement of an intersection between the line-of-sight direction and the display 131. Hereinafter, an intersection between the line-of-sight direction and the display 131 will be referred to as a line-of-sight position 331 as illustrated in FIG. 3B.

The line-of-sight position detection unit 211 according to the present embodiment calculates, for each time, the line-of-sight position 331 within a first area set in advance in the display 131 and that within a second area set in the outer periphery of the first area. Then, the line-of-sight position detection unit 211 makes the line-of-sight position 331 associated with a calculation time each time it calculates the line-of-sight position 331, and outputs it to the application control unit 213 and the display control unit 215.

[Display Area]

Here, the relation between the first area and second area set within the display 131 will be described. FIG. 4A illustrates the display 131 as viewed from the user 910 side. Note that the display 131 mentioned below shall include the frame 109H.

The display 131 includes a left-side second image acquisition unit 134L, a right-side second image acquisition unit 134R, a displayable area 310, and the frame 109H.

The left-side second image acquisition unit 134L is provided so as to include the iris, pupil, and the like of the left eye of the user 910 within its image capturing range, and the right-side second image acquisition unit 134R is provided so as to include the iris, pupil, and the like of the right eye thereof within its image capturing range.

In the present embodiment, the first area 311 and the second area 312 are set in an area of the display 131 in which the line-of-sight position 331 of the user 910 can be detected (corresponding to line-of-sight detection area). The line-of-sight detection sensor is set such that the area obtained by combining the first area 311 and the second area 312 can be the line-of-sight detection area.

The first area 311 is set in a predetermined area within the displayable area 310 of the display 131. The second area 312 is set in the entire outer periphery of the first area 311, having a predetermined width. The positions of the first area 311 and second area 312 are identified based on, for example, coordinates of a coordinate system defined in the information display device 100 (corresponding to device coordinate system). The line-of-sight position 331 is also identified in the same manner as above. In the following, a specific setting example of the first area 311 and second area 312 will be described.

For example, as illustrated in FIG. 4B, the first area 311 can be set in an area substantially equivalent to the displayable area 310 of the display 131. In this case, the second area 312 is set in, for example, an area substantially equivalent to the frame 109H.

For example, as illustrated in FIG. 4C, the second area 312 can be set in an area having a predetermined width so as to extend along the inner periphery of the displayable area 310 of the display 131. In this case, the first area 311 is set in an area inside the second area 312 within the displayable area 310 of the display 131. Note that, in this case, the line-of-sight detection area of the line-of-sight detection sensor can be set narrower than that in the case of FIG. 4B, thereby improving the resolution of the line-of-sight detection.

The application control unit 213 is configured to control the processing, such as activation and execution of each application software. The application control unit 213 outputs a state signal indicating the control state to the display control unit 215 at a predetermined time interval. Furthermore, the application control unit 213 outputs a display instruction signal to provide a display instruction to the display control unit 215 as necessary.

The display control unit 215 is configured to control the display 131 to display or hide the menu thereon or therefrom in accordance with the line-of-sight position 331 received at a predetermined time interval from the line-of-sight position detection unit 211 and the state signal received from the application control unit 213.

While the menu is not being displayed, when the temporal change (corresponding to movement) in the line-of-sight position 331 corresponds to a predetermined mode (corresponding to menu display behavior), the display control unit 215 displays the menu. Furthermore, while the menu is being displayed, when the temporal change in the line-of-sight position 331 corresponds to a predetermined mode (corresponding to menu removal behavior), the display control unit 215 hides the displayed menu.

In the present embodiment, the display control unit 215 controls whether the menu is to be displayed or not to be displayed based on how the line-of-sight position 331 moves between the first area 311 and the second area 312. As described above, the first area 311, second area 312, and line-of-sight position 331 are identified based on the coordinates of the device coordinate system.

[Menu Display Behavior]

Hereinafter, the menu display behavior will be described with reference to FIG. 5A to FIG. 5D. When the menu display behavior is detected based on the temporal change in the line-of-sight position 331, the display control unit 215 displays the menu in the first area 311. Here, the case where the first area 311 is set in an area substantially equivalent to the displayable area 310 and the second area 312 is set in an area substantially equivalent to the frame 109H will be described as an example. In the case where the first area 311 and the second area 312 are set as illustrated FIG. 4C, the menu display position by the display control unit 215 is not limited to the first area 311 but may be the second area 312.

Figure 5A:
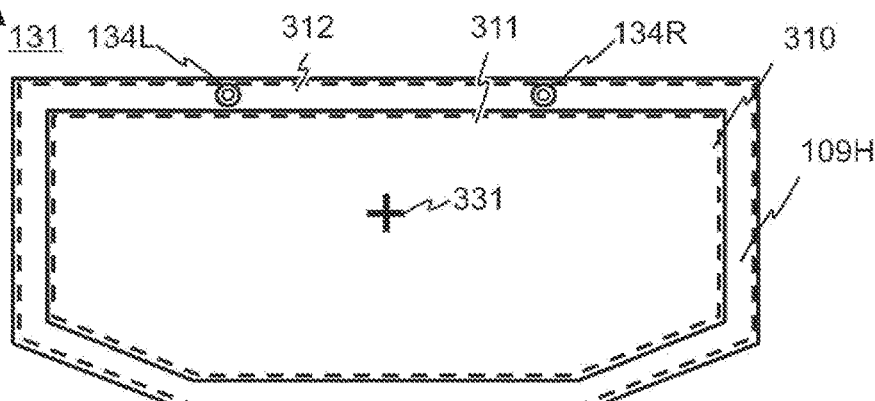

FIG. 5A illustrates a state of the line-of-sight position 331 while the user 910 normally operates the information display device 100 (corresponding to "during a normal operation"). The normal operation corresponds to, for example, a state in which the user 910 is operating each application or the like normally or a state in which the user 910 is not operating each application but viewing the outside world through the display 131. During the normal operation, the line-of-sight position 331 is within the displayable area 310, that is, in this case, within the first area 311. Note that the line-of-sight position 331 is illustrated for the purpose of explanation, but is not displayed during actual use.

In the following, while the line-of-sight position 331 of the user 910 is within the first area 311 and the menu is not being displayed on the display 131, when detecting that the movement of the line-of-sight position 331 corresponds to the menu display behavior which includes a predetermined series of motions, the display control unit 215 displays the menu in a predetermined area.

In the present embodiment, the menu display behavior includes a leaving behavior, a staying behavior, and an entering behavior.

Figure 5B:
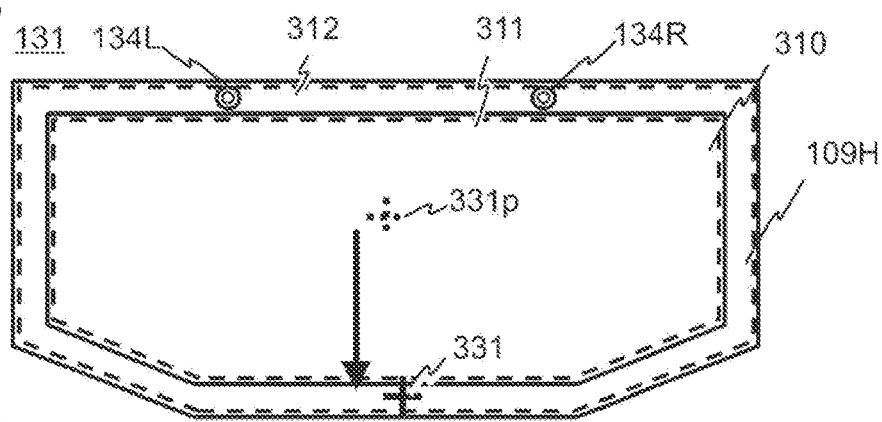

As illustrated in FIG. 5B, the leaving behavior is a motion in which the line-of-sight position 331 moves from the first area 311 to the second area 312. In FIG. 5B a reference sign 331p indicates the line-of-sight position 331 in the past. In the following, the same applies to other drawings.

The display control unit 215 determines whether the line-of-sight position 331 is within the first area 311 or within the second area 312 every time it receives the line-of-sight position 331. In the case where the determination result indicates that the line-of-sight position 331 is within the second area 312 and the immediately preceding determination result indicates that it was within the first area 311, the display control unit 215 recognizes the detection of the leaving behavior.

The staying behavior is a motion in which the line-of-sight position 331 of the user 910 stays at a predetermined position for a predetermined period of time. The staying behavior after the leaving behavior is a motion in which the line-of-sight position 331 stays at the second area 312 for a predetermined period of time. In the case where the determination result indicating that the line-of-sight position 331 is within the second area 312 remains the same for a predetermined period of time or longer, the display control unit 215 recognizes the detection of the staying behavior.

This staying behavior is provided to prevent the unintended line-of-sight movement of the user 910 from being regarded as the menu display behavior. The predetermined period of time used for the determination is referred to as a first period. The first period is set to a period of time during which it can be grasped that the user 910 intentionally makes the line of sight stay within the second area 312, for example, one second or the like.

Figure 5C:
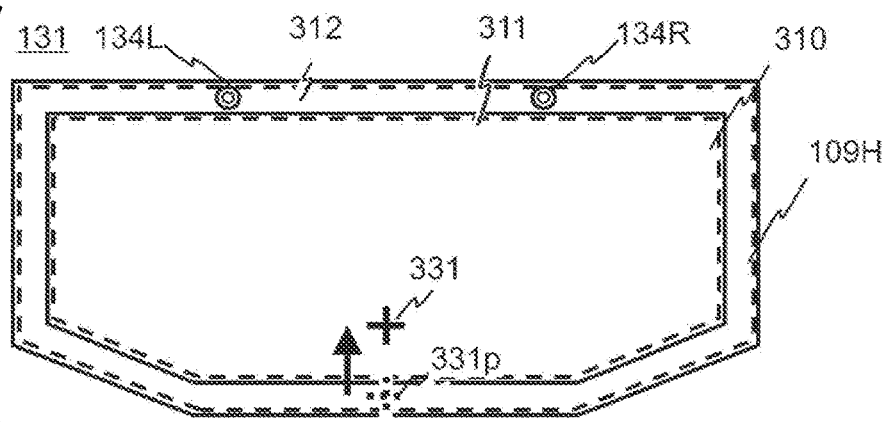

The entering behavior is, as illustrated in FIG. 5C, a motion in which the line-of-sight position 331 moves from the second area 312 to the first area 311. The display control unit 215 determines whether the line-of-sight position 331 is within the first area 311 or within the second area 312 every time it receives the line-of-sight position 331. In the case where the determination result indicates that the line-of-sight position 331 is within the first area 311 and the immediately preceding determination result indicates that it was within the second area 312, the display control unit 215 recognizes the detection of the entering behavior.

Figure 5D:
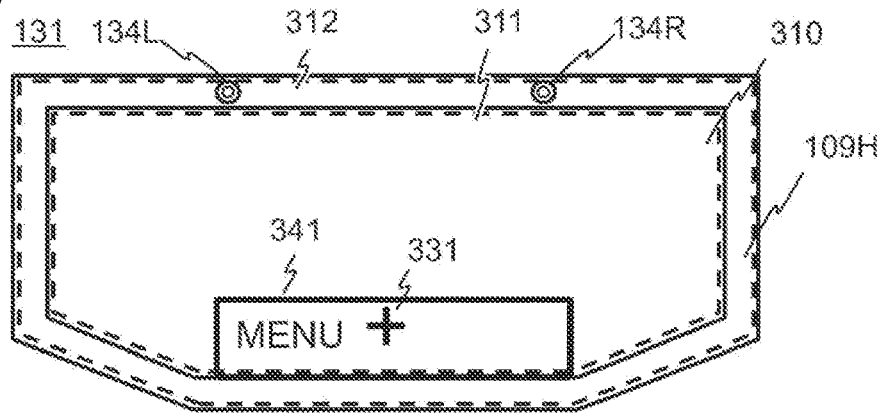

In the case of detecting the leaving behavior, the staying behavior, and the entering behavior in this order based on the temporal change in the line-of-sight position 331, the display control unit 215 recognizes the detection of the menu display behavior, and displays a menu 341 at a predetermined position as illustrated in FIG. 5D.

Note that an area in which the menu 341 is to be displayed (corresponding to menu display area) is a predetermined area within the first area 311. The menu display area may be a fixed area within the first area 311, or may be an area including the line-of-sight position 331 at which the menu 341 is to be displayed.

Figure 6A:
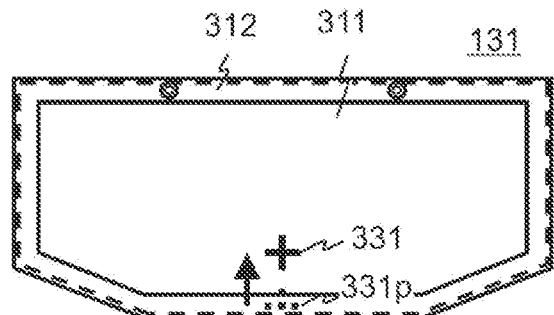
Figure 6A:
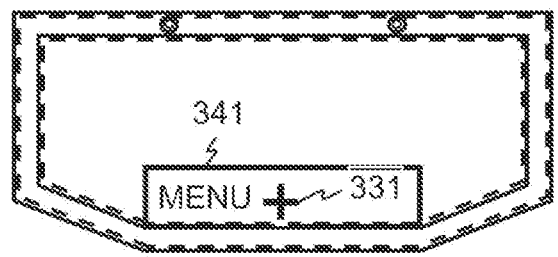

For example, in the example of FIG. 6A, as illustrated in the upper diagram, the line-of-sight position 331 enters the first area 311 from the lower direction of FIG. 6A. In the present embodiment, when the line-of-sight position 331 is firstly detected in the first area 311, the display control unit 215 displays the menu 341 therein. Thus, as illustrated in the lower diagram in FIG. 6A, the menu 341 is displayed in an area (corresponding to lower side of the first area 311) including the line-of-sight position 331 firstly detected.

Figure 6B:
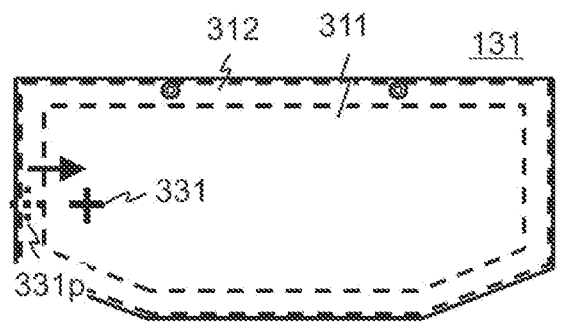
Figure 6B:
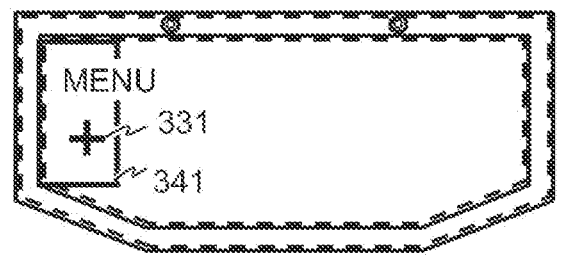
Figure 6C:
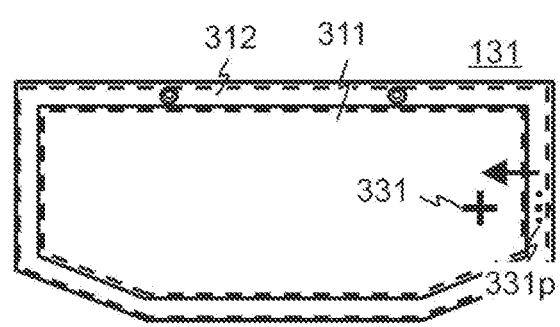
Figure 6C:
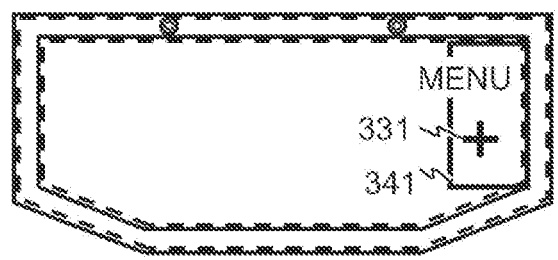
Figure 6D:
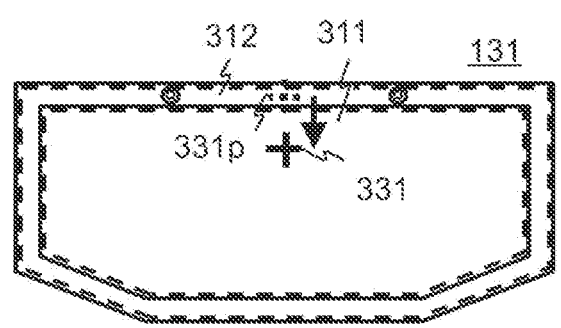
Figure 6D:
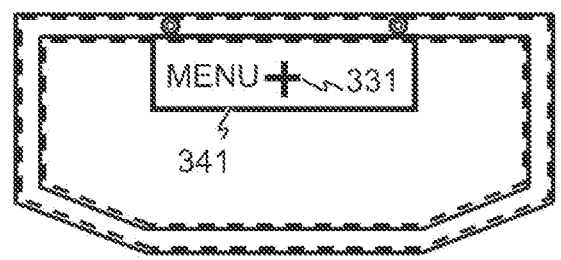

Similarly, in the example of FIG. 6B, the menu 341 is displayed on the left side thereof, in the example of FIG. 6C, the menu 341 is displayed on the right side thereof, and in the example of FIG. 6D, the menu 341 is displayed on the upper side thereof.

This arrangement enables the menu 341 to be reliably displayed on the line of sight of the user 910 who intends to make the menu display.

In the case where the information display device 100 is provided with a plurality of menus 341, menu display areas may be set separately in advance for each of the menus 341.

[Menu Removal Behavior]

While the line-of-sight position 331 is within the first area 311 and the menu 341 is being displayed on the display 131, when detecting that the movement of the line-of-sight position 331 corresponds to a menu removal behavior which includes a predetermined series of motions, the display control unit 215 hides (in other words "removes") the displayed menu 341.

In the present embodiment, the menu removal behavior includes the leaving behavior and the staying behavior.

Figure 7A:
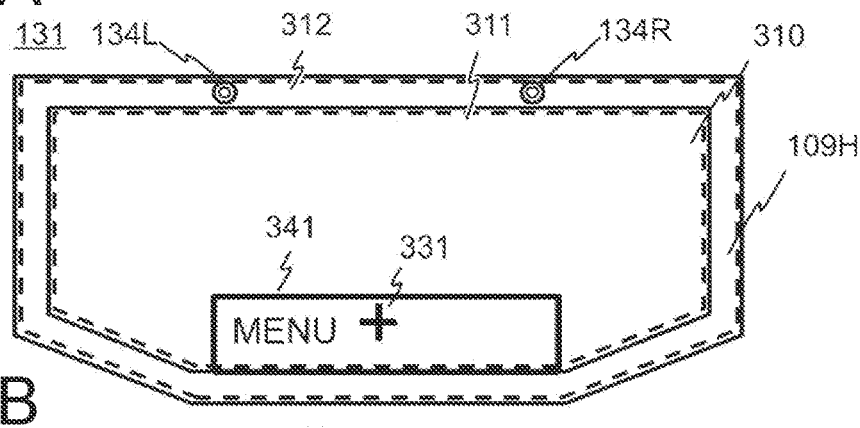
Figure 7B:
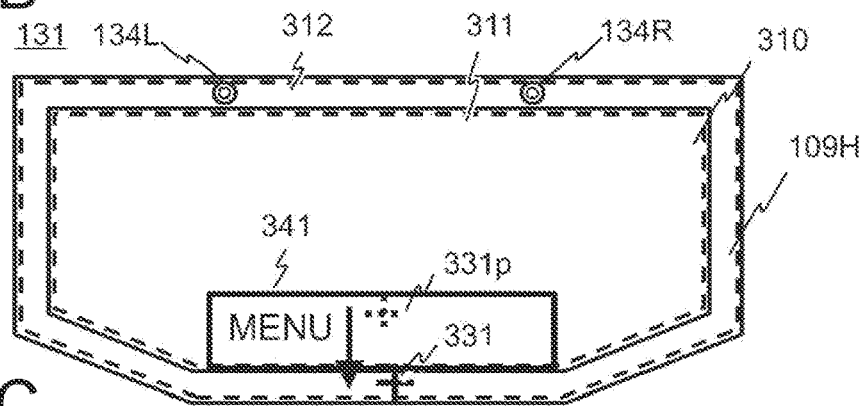
Figure 7C:
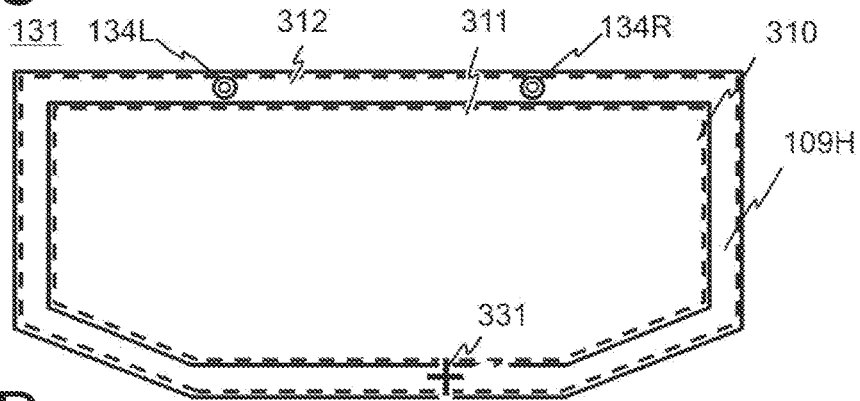
Figure 7D:
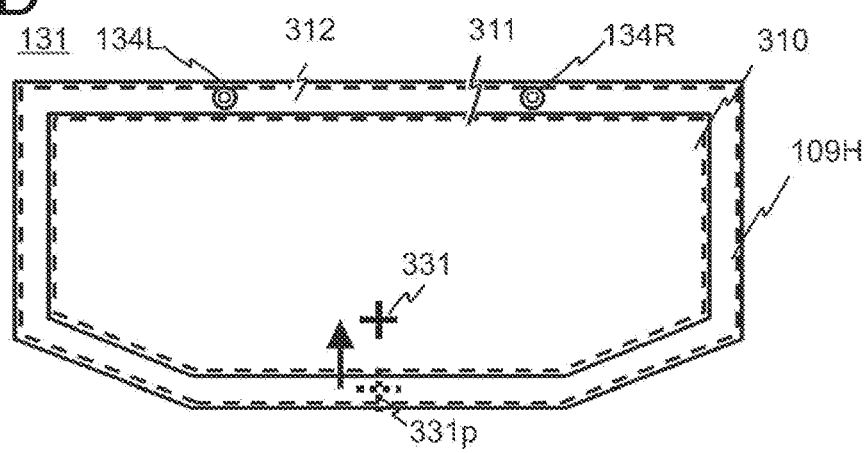

The leaving behavior of the menu removal behavior is based on, as illustrated in FIG. 7A, the state in which the menu 341 is being displayed in the first area 311 and the line-of-sight position 331 is within the first area 311. In this state, in the case of detecting the leaving behavior and the staying behavior as illustrated in FIG. 7B in this order based on the temporal change in the line-of-sight position 331, the display control unit 215 recognizes that the menu removal behavior has been performed, and as illustrated in FIG. 7C, hides the displayed menu 341. In this case, even when the entering behavior as illustrated in FIG. 7D is detected after the menu removal behavior, the display control unit 215 does not recognize that the menu display behavior has been performed.

In the present embodiment, there is no limitation in the entering direction and leaving direction. Furthermore, the predetermined period of time used to determine the staying behavior of the menu display behavior (hereinafter, referred to as a first period) and the predetermined period of time used to determine the staying behavior of the menu removal behavior (hereinafter, referred to as a second period) may be the same or different period of time.

[Menu Display Control Processing]

Next, a flow of menu display control processing by the display control unit 215 according to the present embodiment will be described. FIG. 8 is a processing flow of the menu display control processing according to the present embodiment. This processing is started when the information display device 100 is activated. An initial position of the line-of-sight position 331 shall be within the first area 311.

Hereinafter, an example in which the menu display behavior includes a series of motions of the line-of-sight position 331 described above, namely, moving from the first area 311 to the second area 312, staying within the second area 312 for the first period, and returning from the second area 312 to the first area 311, will be described. Note that the first period and the second period shall be the same period of time.

The display control unit 215 determines whether the line-of-sight position 331 is within the first area 311 at a predetermined time interval (step S1101).

If the line-of-sight position 331 is within the first area 311 (step S1101; Yes), the display control unit 215 continues to detect whether it is within the first area 311 at a predetermined interval.

On the other hand, if the line-of-sight position 331 is not within the first area 311 (step S1101; No), the display control unit 215 initializes the timer 180 (step S1102) in order to measure the time during which the line-of-sight position 331 stays outside the first area 311.

Thereafter, the display control unit 215 determines whether the line-of-sight position 331 is within the first area 311 (step S1103) in order to determine whether the line-of-sight position 331 intentionally moves outside the first area 311 in step S1101.

When determining that the line-of-sight position 331 is within the first area 311 (step S1103; Yes), the display control unit 215 returns to step S1101 and repeats the processes. This is because the display control unit 215 has determined that a period of time during which the line-of-sight position 331 moves outside the first area 311 in step S1101 is less than the first period, and thus the movement is unintentional movement.

On the other hand, when determining that the line-of-sight position 331 is present outside the first area 311 (step S1103; No), the display control unit 215 increments the timer 180 by a predetermined increase mount (step S1104), and determines whether a value of the timer 180 after being incremented is equal to or more than a first time threshold value T1 corresponding to the first time period (step S1105).

If the value of the timer 180 is less than the first time threshold value (step S1105; No), the display control unit 215 returns to step S1103 and repeats the processes. This is because the first period has not elapsed after the line-of-sight position 331 moved outside the first area 311.

If the value of the timer 180 is equal to or more than the first time threshold value (S1105; Yes), the display control unit 215 determines whether the menu 341 is being displayed (step S1106). For example, having set a menu display flag or the like while the menu 341 is being displayed enables the display control unit 215 to determine whether the menu is being displayed by detecting the flag. Meanwhile, a method of determining whether the menu is being displayed is not limited thereto.

In the case where no menu 341 is being displayed (step S1106; No), the display control unit 215 determines whether the line-of-sight position 331 is within the first area 311 (step S1107). When the line-of-sight position 331 is preset outside the first area 311 (step S1107; No), the display control unit 215 stands by until it is within the first area 311.

When detecting that the line-of-sight position 331 is within the first area 311 (S1107; Yes), the display control unit 215 displays the menu 341 (step S1108), and returns to step S1101.

On the other hand, in the case where there is any menu 341 which is being displayed (step S1106; Yes), the display control unit 215 removes the displayed menu 341 (step S1109), and returns to step S1101.

The display control unit 215 repeats the processing above while the information display device 100 is being activated.

As described above, the present embodiment comprises the display 131; the line-of-sight detection sensor configured to detect a line of sight of the user 910; the line-of-sight position detection unit 211 configured to detect, as the line-of-sight position 331, an intersection between the line of sight detected by the line-of-sight detection sensor and the display 131; and the display control unit 215 configured to control the display 131 in accordance with the line-of-sight position 331 detected by the line-of-sight position detection unit 211. The display control unit 215 is further configured to, when detecting an entering behavior in which the line-of-sight position 331 moves from the outside of the first area 311, which is a display area within the display 131, to the inside of the first area 311, display the predetermined menu 341 in the first area.

According to the present embodiment, only using the line of sight of the user 910 enables control of displaying or hiding the menu 341. Thus, the present embodiment does not require a physical switch to be used to display the menu.

Furthermore, the display control unit 215 is configured to, in the case of detecting the staying behavior in which the line-of-sight position 331 continues to stay outside the first area 311 for a predetermined period of time prior to the entering behavior, display the predetermined menu 341 in the first area. In the present embodiment, the instruction is identified not only merely using the movement of the line of sight, but also based on a predetermined series of motions. Therefore, it is possible to reliably control to display or hide the menu 341 in accordance with the intention of the user 910.

In general, even when a person keeps looking at a single position, involuntary fine movement, in which the eyeball always sightly keeps moving, occurs during fixation, and thus the information about the line-of-sight direction output from the line-of-sight identification unit 217 includes fluctuation due to this fine movement during fixation. In order to reduce the influence of the fluctuation, the low pass filter (LPF) processing may be performed on the information about the line-of-sight direction output from the line-of-sight identification unit 217. This makes it possible to reduce the erroneous detection in the processing executed by the line-of-sight position detection unit 211 to determine whether the line-of-sight position 331 is within the first area 311.

<First Modification>

In the processing above, the menu display behavior includes a series of motions in which, while the menu 341 is not being displayed, the line-of-sight position 331 moves from the first area 311 to the second area 312, stays in the second area 312 for a predetermined period of time (corresponding to the first period), and then returns to the first area 311. However, the menu display behavior is not limited thereto.

For example, the menu display behavior may include motions in which the line-of-sight position 331 moves from the first area 311 to the second area 312, and thereafter, without limiting the predetermined period of time, returns to the second area 312. That is, the first period may be zero second. Similarly, the second period may also be zero second.

Such a case does not need the processes from step S1102 to step S1105 in the menu display control processing described above.

<Second Modification>

In the embodiment above, the first area 311 and the second area 312 are set as the line-of-sight detection area. However, the present invention is not limited thereto, and only the first area 311 may be set as the line-of-sight detection area.

In this case, in the menu display behavior, the leaving behavior, the staying behavior, and the entering behavior are performed in this order in the same manner as the one described above. On the other hand, the leaving behavior is a motion in which the line-of-sight position 331 moves from the first area 311 to the outside of the first area 311 (corresponding to outside the line-of-sight detection area), the staying behavior is a motion in which the line-of-sight position 331 stays outside the first area 311, and the entering behavior is a motion in which the line-of-sight position 331 moves from the outside of the first area 311 into the first area 311.

That is, the menu display behavior shall correspond to the movement in which, while the menu 341 is not being displayed, the line-of-sight position 331 moves outside the first area 311, does not return to the first area 311 for the first period, and after the first period or more has elapsed, returns to the first area 311. The menu removal behavior shall correspond to the movement in which, while the menu 341 is being displayed, the line-of-sight position 331 moves outside the first area 311, and does not return to the first area 311 for the second period or longer.

In this case, the display control unit 215 determines whether the line-of-sight position 331 is within the first area 311 every time it receives the line-of-sight position 331. In the case where the determination result is negative and the immediately preceding determination result indicates that the line-of-sight position 331 was within the first area 311, the display control unit 215 recognizes the detection of the leaving behavior.

Furthermore, the display control unit 215 recognizes the detection of the staying behavior in the case where the negative determination result above remains the same for a predetermined period or longer.

Still further, the display control unit 215 recognizes the detection of the entering behavior in the case where the determination result indicates that the line-of-sight position 331 is within the first area 311, and also the immediately preceding determination result is negative.

<Third Modification>

In the embodiment described above, the menu 341 is displayed in an area including the line-of-sight position 331. However, a display position of the menu 341 is not limited thereto.

In the present modification, the first area 311 is virtually divided into a plurality of areas in advance. Each of the areas is identified using coordinate values of the device coordinate system. Hereinafter, as illustrated in FIG. 9A, the case where the first area 311 is divided into four areas, i.e., upside, downside, left-side, and right-side areas, will be described as an example. Here, the divided areas obtained by dividing the first area 311 is defined as an upside area 311*u*, a downside area 311*d*, a left-side area 311*l*, and a right-side area 311*r*, respectively. Furthermore, the second area 312 provided in the outer peripheral portion of the first area 311 is also divided in accordance with the division of the first area 311.

In the same manner as that of the embodiment above, the menu display behavior shall correspond to a series of motions in which, while the menu 341 is not being displayed, the line-of-sight position 331 moves from the first area 311 to the second area 312, stays in the second area 312 for the first period, and then returns to the first area 311.

In the present modification, the display control unit 215 is configured to set, as an entering area, a divided area where the line-of-sight position 331 firstly enters in the entering behavior of the menu display behavior, and display the menu 341 within this entering area.

For example, as illustrated in FIG. 9B, the menu 341 may be displayed in an area not including the line-of-sight position 331 which was firstly detected in the first area 311 as a result of the entering behavior as long as it is within the entering area.

In this case, at the time when the line-of-sight position 331 is firstly detected in the first area 311 after the staying behavior, the display control unit 215 determines which area of the divided areas corresponds to the detected position. Then, the display control unit 215 identifies the entering area based on the determination result, and displays the menu 341 in the entering area.

A display position of the menu 341 in each of the divided areas is set in advance.

In this case, in the processing flow described above, after determining that the line-of-sight position 331 is within the first area in step S1107, the display control unit 215 determines in which of the divided areas the line-of-sight position 331 is present. Then, the display control unit 215 sets, as the entering area, the divided area as determined, and displays the menus 341 in the entering area in step S1108.

Note that the division of the first area 311 is not limited thereto. The number of divided areas obtained by the division and the manner of division can be arbitrarily set. For example, as illustrated in FIG. 9C, the first area 311 may be divided into eight areas, i.e., a right upside area 311*ru*, a left upside area 311*lu*, an upper left-side area 311*ul*, a lower left-side area 311*dl*, a left downside area 311*ld*, a right downside area 311*rd*, a lower right-side area 311*dr*, and an upper right-side area 311*ur*.

According to the present modification, it is possible to realize a user-friendly menu display.

<Fourth Modification>

In the case where the first area 311 is divided into a plurality of areas and the menu 341 is displayed in the entering area, the menu 341 to be displayed in the entering area can be made different depending on the entering area.

In this case, a menu table 221, in which the menu 341 to be displayed in each of the divided areas is made associated with each application, is provided and registered in the memory and storage 110. FIG. 10 illustrates an example of the menu table 221 to be registered.

The display control unit 215 identifies the menu 341 to be displayed and a divided area in which the identified menu 341 is to be displayed in accordance with the analysis result of the menu display behavior and the menu table 221, and displays the menu 341.

In this example, while the application AAA (which may be the OS of the information display device 100) is running, when the line-of-sight position 331 returns to the downside area 311*d* as a result of the entering behavior (in the case where the downside area 311*d* is analyzed as the entering area), the display control unit 215 displays a main menu (menu or the like displayed with the selection of a start button of Windows (registered trademark)) in the downside area 311*d*. Furthermore, when the line-of-sight position 331 returns to the left-side area 311*l*, the display control unit 215 displays a list of application icons (shortcut list of applications that can be activated in the information display device 100) in the left-side area 311*l*. Still further, when the line-of-sight position 331 returns to the right-side area 311*r*, the display control unit 215 displays a performance monitor screen (Windows task manager screen or the like) in the right-side area 311*r*. Still further, when the line-of-sight position 331 returns to the upside area 311*u*, the display control unit 215 displays a Web search result and the like relating to an image acquired by the external camera, which is the first image acquisition unit 133*f*, in the upside area 311*u*.

As described above, the menu 341 to be displayed is not limited to the general menu 341 including choices. For example, an application icon list, Web search result, execution screen of a predetermined application (such as a screen that has been newly started or is being executed in the background) or the like may be selectively displayed depending on the entering area.

Note that items on the displayed menu 341 or the like may be selected also using the line-of-sight position 331. For example, when detecting predetermined movement of the line-of-sight position 331, the display control unit 215 recognizes that a specific item has been selected. The predetermined movement is, for example, that the line-of-sight position 331 stays on a specific item for a predetermined time or longer. Each menu display position, an area of each item on the menu and the like are identified based on the coordinate values of the device coordinate system.

In the case of including the touch sensor 122, the information display device 100 may be configured to accept selection using a combination of the line-of-sight position 331 and an operation on the touch sensor 122. For example, the information display device 100 can accept a tapping motion of the touch sensor 122 while the line-of-sight position 331 is being placed on an item to be selected.

<Fifth Modification>

In the embodiment above, when detecting that the line-of-sight position 331 is present outside the first area 311 while the menu 341 is being displayed, the display control unit 215 removes the menu 341. However, the menu 341 does not necessarily have to be removed even when the line-of-sight position 331 is present outside the first area 311.

The menu 341 may not be removed in the case where the line-of-sight position 331 leaves in a direction different from the direction in which the line-of-sight position 331 entered the first area 311 at the time when the menu 341 was displayed. In this case, the entering direction (corresponding to information about the entering area) at the time when the menu 341 was displayed is stored in association with the displayed menu 341.

For example, as illustrated in the upper diagram of FIG. 11A, in the case where the line-of-sight position 331 enters the first area 311 from the lower direction and thus the menu 341 is displayed as illustrated in the lower diagram of FIG. 11A, the downside area 311d of the first area 311 is registered in association with the menu 341. Thereafter, when detecting that the line-of-sight position 331 leaves in one of the directions of left direction, right direction, and upper direction, the display control unit 215 does not remove the menu 341.

More specifically, as illustrated in the upper diagram of FIG. 11B, when detecting that the line-of-sight position 331 leaves in the lower direction of FIG. 11B, since the leaving direction is the same as the entering direction at the time when the menu 341 was displayed, the display control unit 215 removes the menu 341 as illustrated in the lower diagram of FIG. 11B. In other words, in the case where the line-of-sight position 331 detected immediately before leaving to the second area 312 corresponds to the downside area 311d in the first area 311, since it is the same as the divided area registered in association with the displayed menu 341, the display control unit 215 removes the menu.

On the other hand, as illustrated in the upper diagram of FIG. 11C, when detecting that the line-of-sight position 331 leaves in the left direction, the display control unit 215 does not remove the menu 341. In other words, when the line-of-sight position 331 detected immediately before leaving to the second area 312 is the left-side area 311d in the first area 311, since it is different from the divided area registered in association with the displayed menu 341, the display control unit 215 does not remove the menu as illustrated in the lower diagram of FIG. 11C. In this case, the display control unit 215 continues displaying the menu 341 as it is.

<Sixth Modification>

Furthermore, in the case where the line-of-sight position 331 leaves in a direction different from the entering direction (corresponding to first entering direction) at the time when the menu 341 was displayed, when the line-of-sight position 331 enters from a second entering direction different from the first entering direction after leaving the first area 311 and staying for the first period in the same manner, the display control unit 215 may display a menu 341a which is different from the menu 341 in the divided area corresponding to the second entering direction.

In this case, when detecting that the line-of-sight position 331 has entered from the second entering direction, the display control unit 215 refers to the menu table 221 and displays the menu 341 registered in association with the corresponding divided area.

For example, as illustrated in the upper diagram of FIG. 12A, the line-of-sight position 331 enters the first area 311 from the lower direction, and thus the display control unit 215 displays the menu 341 as illustrated in the lower diagram of FIG. 12A.

Then, while the menu 341 is being displayed, as illustrated in the upper diagram of FIG. 12B, the line-of-sight position 331 leaves in a direction different from the first entering direction, stays for the first period, and as illustrated in the lower diagram of FIG. 12B, enters from a direction different from the first entering direction.

In this case, since the leaving direction is different from the first entering direction, as illustrated in the middle diagram of FIG. 12B, the display control unit 215 continues displaying the menu 341 even after the line-of-sight position 331 leaves. Then, as illustrated in the lower diagram of FIG. 12B, the display control unit 215 displays, in the new entering area, another menu registered in the menu table 221 in association with the new entering area.

Furthermore, while the menu 341 is being displayed, as illustrated in the upper diagram of FIG. 12C, in the case where the line-of-sight position 331 leaves in a direction different from the first entering direction, stays for the first period, and then enters from the first entering direction again, the display control unit 215 may display a sub-menu 341b of the currently displayed menu 341 as illustrated in the lower diagram of FIG. 12C. At this time, for example, the sub-menu 341b may be displayed behind the currently displayed menu 341 in such a manner that a part of the sub-menu 341b overlaps the menu 341.

In this case, since the leaving direction is different from the first entering direction, as illustrated in the middle diagram of FIG. 12C, the display control unit 215 continues displaying the menu 341 even after the line-of-sight position 331 leaves.

<Seventh Modification>

Still further, in the case where the line-of-sight position 331 enters from the same entering direction again, it may be recognized that an item in the menu 341, through which the line-of-sight position 331 passed at that time, has been selected. This modification will be described with reference to FIG. 13A to FIG. 13C.

Here, an example in which the menu 341 to be displayed is a list of applications will be described. In this example, applications A-E are listed and displayed as choices.

As illustrated in the upper diagram of FIG. 13A, in the present example, the line-of-sight position 331 enters the first area 311 from the lower direction, and as illustrated in the lower diagram of FIG. 13A, the menu 341 is being displayed in the downside area 311d which is one of the divided areas. In other words, the premise of this example is that the first entering direction, which is the entering direction at the time when the menu 341 was displayed, is the direction from the lower side to upper side, and thus the entering area is the downside area 311d.

In this state, as illustrated in the upper diagram of FIG. 13B, in the case where the line-of-sight position 331 moves in the left direction and leaves the first area 311, the first entering direction and the leaving direction are different from each other. Thus, as illustrated in the lower diagram of FIG. 13B, the display control unit 215 continues displaying the menu 341 as it is.

That is, the display control unit 215 does not remove but continues displaying the menu as it is when detecting that the line-of-sight position 331 moves in the second direction which is different from the first entering direction and leaves the first area 311.

In this state, as illustrated in the upper diagram of FIG. 13C, when the line-of-sight position 331 enters the first area 311 again from the lower direction, the display control unit 215 determines that the current entering direction is the same as the first entering direction. In this case, the display control unit 215 recognizes that the application on the route in the entering direction at this time has been selected.

The display control unit 215 compares each selection area in the menu 341 of the list of applications with the line-of-sight position 331 to identify the selected application. Each selection area is identified based on coordinate values of the device coordinate system, and stored in the memory and storage 110.

Then, the display control unit 215 transmits information identifying the selected application to the application control unit 213. The display control unit 215 displays an initial menu of the application which has transmitted from the application control unit 213 in response thereto.

Note that the display control unit 215 determines which item in the currently displayed menu 341 is selected based on the coordinate position.

<Eighth Modification>

The information display device 100 may be a smart phone. In the following, an appearance and states of the information display device 100 in the case where it is a smartphone will be described. FIG. 14A is a front view of the information display device 100, and FIG. 14B is a rear view thereof. In the following, an arrangement of each part described in the hardware configuration will be explained.

The information display device 100 includes a case 109S in which each part of the information display device 100 is housed. Note that, in the following, the vertical direction and lateral direction are as illustrated.

The case 109S is provided with the display 131 at the center of the front face. In the case of the smartphone 100S, it includes a touch screen 127 combining the display 131 and the touch panel 123.

The case 109S is provided with the first image acquisition unit 133 (rear camera, in other words "out-camera") on the rear face, and the second image acquisition unit 134 (front camera, in other words "in-camera") on the front face. The second image acquisition unit 134 is placed above the front display 131.

The case 109S is provided with the audio output unit 141, for example, at the upper central portion of the display 131 on the front face and at the lower portion on the rear face, respectively. An audio output unit 141M placed on the upper portion of the front face of the case 109S is a mono speaker, and is used for voice calls. An audio output unit 141S placed at the lower portion of the rear face of the case 109S is a stereo speaker, and is used for reproducing moving images or the like. Furthermore, the audio input unit 143 is provided, for example, on the lower face of the case 109S.

The distance sensor 155 is placed on the rear face of the case 109S, for example, next to the first image acquisition unit 133.

As the operation key 121, for example, a power switch 121P is placed on the upper face of the case 109S. As the extended interface unit 170, a USB terminal 170U is placed on the lower face of the case 109S. In addition, the case 109S may be provided with a fingerprint sensor 124 to be placed on the rear face, an LED 125 to be placed above the display 131 on the front face and the like.

In the case where the information display device 100 is a smart phone, a line-of-sight position of the user 910 on the display 131 is detected, and the same processing as that of the embodiment and modifications above is executed. In this case, the first area 311 may be set to an area substantially equivalent to the display 131 while the second area 312 may be set to an area substantially equivalent to the case 109S which is in the outer periphery of the display 131.

The present invention is not limited to the embodiment and modifications described above, and other various modifications are included therein. For example, the embodiment and modifications described above have been explained in detail in order to clarify the present invention, but are not necessarily limited to those having all the features as described. In addition, a part of the configuration of the present embodiment and modifications can be replaced with that of other embodiments and modifications, and the feature of other embodiments and modifications can be added to the configuration of the present embodiment. Furthermore, it is possible to add, delete, or replace other configurations with respect to a part of the configuration of the present embodiment and modifications.

Some or all the configurations, functions, processing units, and processing means described above may be implemented by hardware, for example, by designing them with an integrated circuitry. In addition, the configurations and functions described above may be implemented by software by interpreting and executing programs in which the processor implements the respective functions. Information such as programs, tables, and files for implementing various functions can be placed in recording devices such as a memory, hard disk, and solid-state drive (SSD), or recording media such as an IC card, SD card, and DVD.

Furthermore, the control lines and information lines which are considered to be necessary for the purpose of explanation are indicated herein, but not all the control lines and information lines of actual products are necessarily indicated. It may be considered that almost all the configurations are actually connected to each other.

REFERENCE SIGNS LIST

100: information display device, 100H: HMD, 100S: smartphone, 101: main processor, 102: system bus, 103: RAM, 104: storage, 109H: frame, 109S: case, 110: memory and storage, 120: operation acceptance device, 121: operation key, 121P: power switch, 122: touch sensor, 123: touch panel, 124: fingerprint sensor, 125: LED, 127: touch screen, 130: image processing device, 131: display, 132: image signal processing unit, 133: first image acquisition unit, 133L: left first image acquisition unit, 133R: right first image acquisition unit, 134: second image acquisition unit, 134L: left-side second image acquisition unit, 134R: right-side second image acquisition unit, 140: audio processing device, 141: audio output unit, 141L: left audio output unit, 141M: audio output unit, 141R: right audio output unit, 141S: audio output unit, 142: audio signal processing unit, 143: audio input unit, 150: sensor, 151: GPS reception unit, 152: gyro sensor, 153: geomagnetic sensor, 154: acceleration sensor, 155: range sensor, 160: communication device, 161: LAN communication unit, 162: telephone network communication unit, 163: BT communication unit, 170: extended interface unit, 170U: USB terminal, 180: timer,
211: line-of-sight position detection unit, 213: application control unit, 215: display control unit, 217: line-of-sight identification unit, 221: menu table,
310: displayable area, 311: first area, 311*d*: downside area, 311*dl*: lower left-side area, 311*dr*: lower right-side area, 311*l*: left side area, 311*ld*: left downside area, 311*lu*: left upside area, 311*r*: right side area, 311*rd*: right downside area, 311*ru*: right upside area, 311*u*: upside side area, 311*ul*: upper left-side area, 311*ur*: upper right-side area, 312: second area, 331: line-of-sight position, 341: menu, 341*a*: menu, 341*b*: sub-menu,
910: user

The invention claimed is:

1. An information display device, comprising:
a display;
a line-of-sight detection sensor configured to detect a line of sight of a user;
a line-of-sight position detector configured to detect, as a line-of-sight position, an intersection between the line of sight detected by the line-of-sight detection sensor and the display; and
display control circuitry configured to control the display in accordance with the line-of-sight position detected by the line-of-sight position detector, and
wherein the display control circuitry is further configured to, when detecting an entering behavior in which the line-of-sight position moves from an outside of a first area, which is a display area within the display, to an inside of the first area, display a predetermined menu in the first area,
wherein the first area is included in a line-of-sight detection area in which the line of sight can be detected by the line-of-sight detection sensor,
wherein the first area is narrower than the line-of-sight detection area, and
wherein the display control circuitry is further configured to, in a case of detecting a staying behavior in which the line-of-sight position continues to stay outside the first area for a predetermined period of time prior to the entering behavior, display the predetermined menu in the first area.

2. The information display device according to claim 1, wherein
the display control circuitry is further configured to display the menu in a predetermined area including the line-of-sight position firstly detected within the first area in the entering behavior.

3. The information display device according to claim 1, wherein
the display control circuitry is further configured to display the menu in a predetermined area within the first area.

4. The information display device according to claim 3, wherein
the menu comprises a plurality of menus, and
an area in which each of the menus is to be displayed is predetermined for each of the menus.

5. The information display device according to claim 1, wherein
the display control circuitry is further configured to, in a case of detecting a leaving behavior in which the line-of-sight position moves from the inside of the first area to the outside of the first area prior to the entering behavior, display the predetermined menu in the first area.

6. The information display device according to claim 1, wherein
the line-of-sight detection area is a displayable area of the display.

7. An information display device, comprising:
a display;
a line-of-sight detection sensor configured to detect a line of sight of a user;
a line-of-sight position detector configured to detect, as a line-of-sight position, an intersection between the line of sight detected by the line-of-sight detection sensor and the display; and
display control circuitry configured to control the display in accordance with the line-of-sight position detected by the line-of-sight position detector,
wherein the display control circuitry is further configured to, when detecting an entering behavior in which the line-of-sight position moves from an outside of a first area, which is a display area within the display, to an inside of the first area, display a predetermined menu in the first area,
wherein the first area is divided in advance into a plurality of divided areas so that an outer periphery of the first area is divided into a plurality of areas, and
wherein the display control circuitry is further configured to display the menu in one of the divided areas which includes the line-of-sight position firstly detected in the first area in the entering behavior.

8. The information display device according to claim 7, wherein
the menu comprises a plurality of menus, and
for each of the menus, each of the divided areas is set in advance so that corresponding one of the menus is to be displayed therein.

9. An information display device, comprising:
a display;
a line-of-sight detection sensor configured to detect a line of sight of a user;
a line-of-sight position detector configured to detect, as a line-of-sight position, an intersection between the line of sight detected by the line-of-sight detection sensor and the display; and
display control circuitry configured to control the display in accordance with the line-of-sight position detected by the line-of-sight position detector,
wherein the display control circuitry is further configured to, when detecting an entering behavior in which the line-of-sight position moves from an outside of a first area, which is a display area within the display, to an inside of the first area, display a predetermined menu in the first area,
wherein the first area is divided in advance into a plurality of divided areas so that an outer periphery of the first area is divided into a plurality of areas, and
wherein the display control circuitry is further configured to:
define, as an entering area, one of the divided areas which includes the line-of-sight position firstly detected in the first area in the entering behavior; and
while the menu is being displayed, in a case of detecting a leaving behavior in which the line-of-sight position moves from the inside of the first area to the outside of the first area, and also in a case where one of the divided areas which includes the line-of-sight position detected immediately before the line-of-sight position moves to the outside of the first area in the leaving behavior is the same as the entering area, hide the menu which has been displayed.

10. An information display device, comprising:

a display;

a line-of-sight detection sensor configured to detect a line of sight of a user;

a line-of-sight position detector configured to detect, as a line-of-sight position, an intersection between the line of sight detected by the line-of-sight detection sensor and the display; and display control circuitry configured to control the display in accordance with the line-of-sight position detected by the line-of-sight position detector, the display control circuitry being further configured to, when detecting an entering behavior in which the line-of-sight position moves from an outside of a first area, which is a display area within the display, to an inside of the first area, display a predetermined menu in the first area, wherein the first area is divided in advance into a plurality of divided areas so that an outer periphery of the first area is divided into a plurality of areas, and wherein the display control circuitry is further configured to:

define, as an entering area, one of the divided areas which includes the line-of-sight position firstly detected in the first area in the entering behavior; and while the menu is being displayed, in a case of detecting a leaving behavior in which the line-of-sight position moves from the inside of the first area to the outside of the first area, and also in a case where one of the divided areas which includes the line-of-sight position detected immediately before the line-of-sight position moves to the outside of the first area in the leaving behavior is different from the entering area, continue to display the menu.

11. The information display device according to claim 10, wherein the display control circuitry is further configured to, in a case of detecting a second entering behavior as a new entering behavior after the leaving behavior while the menu continues to be displayed, display another menu different from the menu in the entering area of the second entering behavior.

12. The information display device according to claim 11, wherein in a case where the entering area of the entering behavior is the same as the entering area of the second entering behavior, the another menu different from the menu is a sub-menu of the menu which is being displayed.

13. The information display device according to claim 10, further comprising application control circuitry configured to execute processing selected by a choice displayed on the menu, wherein the display control circuitry is further configured to, while the menu continues to be displayed, in a case of detecting a second entering behavior as a new entering behavior after the leaving behavior, and also in a case where the entering area of the entering behavior is the same as the entering area of the second entering behavior, notify the application control circuitry that the choice on the menu which includes the line-of-sight position detected in the second entering behavior has been selected.

* * * * *